United States Patent
Li et al.

(10) Patent No.: US 9,638,867 B2
(45) Date of Patent: May 2, 2017

(54) SKEW MANAGED MULTI-CORE OPTICAL FIBER INTERCONNECTS

(71) Applicant: Corning Incorporated, Corning, NY (US)

(72) Inventors: Ming-Jun Li, Horseheads, NY (US); Shenping Li, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/854,803

(22) Filed: Sep. 15, 2015

(65) Prior Publication Data

US 2016/0097903 A1 Apr. 7, 2016

Related U.S. Application Data

(60) Provisional application No. 62/060,064, filed on Oct. 6, 2014.

(51) Int. Cl.
| | |
|---|---|
| G02B 6/26 | (2006.01) |
| G02B 6/38 | (2006.01) |
| G02B 6/02 | (2006.01) |
| G02B 6/43 | (2006.01) |
| G02B 6/028 | (2006.01) |

(Continued)

(52) U.S. Cl.
CPC .......... *G02B 6/38* (2013.01); *G02B 6/02042* (2013.01); *G02B 6/43* (2013.01); *G02B 6/0281* (2013.01); *G02B 6/0365* (2013.01); *G02B 6/255* (2013.01)

(58) Field of Classification Search
CPC ....... G02B 6/02042; G02B 6/38; G02B 6/255
See application file for complete search history.

(56) References Cited

U.S. PATENT DOCUMENTS

| | | | |
|---|---|---|---|
| 8,406,595 B2* | 3/2013 | Hayashi | G02B 6/02042 385/123 |
| 8,811,787 B2* | 8/2014 | Feuer | G02B 6/02042 385/123 |
| 8,815,151 B2 | 8/2014 | Whitcomb | |

(Continued)

FOREIGN PATENT DOCUMENTS

JP 2000275014 A 10/2000

OTHER PUBLICATIONS

Koshiba et al., Heterogeneous multi-core fibers: proposal and design principle, IEICE Electronics Express, vol. 6, No. 2, pp. 98-103, 2009.

(Continued)

*Primary Examiner* — Rhonda Peace
(74) *Attorney, Agent, or Firm* — Kevin L. Bray

(57) ABSTRACT

The embodiments described herein relate to multi-core optical fiber interconnects which include at least two multi-core optical fibers. The multi-core optical fibers are connected such that the core elements of the first multi-core optical fiber are optically coupled to the core elements of the second multi-core optical fiber thereby forming an array of interconnect core elements extending through the optical fiber interconnect. The multi-core optical fibers are constructed such that cross-talk between adjacent core elements in each multi-core optical fiber is minimized. The multi-core optical fibers are also constructed such that time-delays between the interconnect core elements in the array of interconnect core elements are also minimized.

32 Claims, 5 Drawing Sheets

(51) Int. Cl.
  *G02B 6/036* (2006.01)
  *G02B 6/255* (2006.01)

(56) References Cited

U.S. PATENT DOCUMENTS

| | | | | |
|---|---|---|---|---|
| 9,086,519 | B2* | 7/2015 | Arakawa | G02B 6/02042 |
| 9,109,969 | B2* | 8/2015 | Kreger | G01B 11/16 |
| 9,120,693 | B2 | 9/2015 | Hoover et al. | |
| 9,151,887 | B2* | 10/2015 | Hoover | G02B 6/02042 |
| 9,250,384 | B2* | 2/2016 | Matsuo | G02B 6/02042 |
| 9,372,304 | B2* | 6/2016 | Bradley | G02B 6/3885 |
| 2011/0129190 | A1 | 6/2011 | Fini et al. | |
| 2014/0003779 | A1* | 1/2014 | Arakawa | G02B 6/02042 385/127 |
| 2014/0064687 | A1* | 3/2014 | Hoover | G02B 6/03644 385/126 |
| 2014/0112615 | A1* | 4/2014 | Kreger | G01B 11/16 385/13 |
| 2014/0178018 | A1* | 6/2014 | Matsuo | G02B 6/02042 385/98 |
| 2016/0097903 | A1* | 4/2016 | Li | G02B 6/43 385/50 |

OTHER PUBLICATIONS

Glas et al., Improvement of the emission characteristics of a multicore tiher laser using self reproduction in a multimode interference device (MMI), Conference Digest. 2000 Conference on Lasers and Electro-Optics Europe (Cat. No. 00TH8505), p. 1, 2000.
Ryszard S. Romaniuk, Broadband buses based on multicore optical fibres, 260 /SPIE vol. 585 Fiber Optic Broadband Networks (1985), pp. 260-265, Downloaded From: http://proceedings.spiedigitallibrary.org/ on Sep. 15, 2015.
Sarkisov et al.: Dark spatial solitons in photopolymer films for optical interconnections, Opt. Eng. 39(3) 616-623 (Mar. 2000).
Jing Gao et al., Dispersion characteristics analysis of asymmetric multi-core fibers, SPIE-OSA-IEEE/ vol. 8307 83072O-1-83072O-7, 2011.
Gasulla et al., Microwave Photonics Applications of Multicore Fibers, IEEE Photonics Journal, vol. 4, No. 3, pp. 876-888, Jun. 2012.
Takenaga et al., Reduction of Crosstalk by Trench-Assisted Multi-Core Fiber, OSA/OFC/NFOEC, OWJ4, pp. 1-3, 2011.
Rasmussen et al., Spatiotemporal control of light by Bloch-mode dispersion in multi-core fibers, Optics Express 5878, vol. 16, No. 8, p. 5878-91, Apr. 14, 2008.
Fini et al., Statistical Models of Multicore Fiber Crosstalk Including Time Delays, Journal of Lightwave Technology, vol. 30, No. 12, Jun. 15, pp. 2003-2010, 2012.
Cen Xia,et al., Supermodes for optical transmission, Optics Express 16653, vol. 19, No. 17, pp. 16653-16664, Aug. 2011.
Sorin et al. "Phase-velocity measurements using prism output coupling for single- and few-mode optical fibers" published on Optics Letters, vol. 11, No. 2, p. 106, 1986.

\* cited by examiner

SKEW MANAGED MULTI-CORE OPTICAL FIBER INTERCONNECTS

This application claims the benefit of priority under 35 U.S.C. §119 of U.S. Provisional Application Ser. No. 62/060,064 filed on Oct. 6, 2014 the content of which is relied upon and incorporated herein by reference in its entirety.

BACKGROUND

Field

The present specification generally relates to optical fiber interconnects and, more specifically, to multi-core optical fiber interconnects with reduced optical signal time delays between core elements within the transmission interconnects.

Technical Background

In recent years optical fiber has become accepted as a viable alternative to traditional materials used for data signal communication. Optical fiber is now widely utilized in a variety of electronic devices to facilitate the high-speed communication of data signals at high bandwidths. However, as the speed and bandwidth of the electronic components in data communication devices increases, there is a corresponding need to increase the speed of optical interconnects which couple such devices. One solution to increase the speed of optical interconnects is to increase the fiber density of the optical interconnects and thereby realize high fiber count connectors. Another solution is to utilize multi-core optical fibers in which a plurality of core elements are disposed in a common cladding, thus reducing the overall bulk of the optical interconnect while increasing the fiber density (i.e., the core density).

One drawback of multi-core optical fibers is crosstalk between cores in the fiber. A requirement of low total crosstalk in interconnects limits the density of cores within the multi-core optical fiber, and thus the capacity scaling, compactness, and cost of the interconnect formed from the multi-core optical fiber. As such, crosstalk suppression has been a primary multi-core optical fiber research. To address crosstalk, trench-assisted homogeneous multi-core optical fibers have been proposed to achieve multi-core optical fibers with high core densities and reduced crosstalk. However, one issue of introducing a trench associated with each core is the significant increase in fiber manufacturing cost. To overcome this drawback, heterogeneous multi-core optical fibers have been proposed. In these multi-core optical fibers any two adjacent cores have slightly different effective refractive indexes which prevents phase-matching coupling between the cores, thereby suppressing crosstalk. However, the different propagating constants between the two cores produces large optical signal time delays between the cores, otherwise referred to as skew. This unwanted skew increases the difficulty of implementing crosstalk equalizers in a communication system. In addition, this unwanted skew prevents multi-core optical fibers from being used in communication systems which require minimized optical signal time delay between the cores, such as, parallel data transmission between multiple processors in data center applications.

Accordingly, a need exists for alternative interconnects utilizing multi-core optical fibers.

SUMMARY

According to one embodiment, a multi-core optical fiber interconnect includes a transmitting multi-core optical fiber having a length $L_T$. The multi-core optical fiber interconnect may also include a first transmitting core element $C_{T\_1}$ positioned in a first common outer cladding, the first transmitting core element $C_{T\_1}$ having a group refractive index $n_{T\_1}^g$ and an effective refractive index $n_{\mathit{eff}T\_1}$. The transmitting mulit-core optical fiber may also include a second transmitting core element $C_{T\_2}$ positioned in the first common outer cladding adjacent to the first transmitting core element $C_{T\_1}$, the second transmitting core element $C_{T\_2}$ having a group refractive index $n_{T\_2}^g$ and an effective refractive index $n_{\mathit{eff}T\_2}$, wherein $n_{\mathit{eff}T\_1}$ and $n_{\mathit{eff}T\_2}$ are different. The multi-core optical fiber interconnect may also include a receiving multi-core optical fiber comprising having a length $L_R$. The receiving multi-core optical fiber may have a first receiving core element $C_{R\_1}$ positioned in a second common outer cladding, the first receiving core element $C_{R\_1}$ having a group refractive index $n_{R\_1}^g$ and an effective refractive index $n_{\mathit{eff}R\_1}$. The receiving multi-core optical fiber may also include a second receiving core element $C_{R\_2}$ positioned in the second common outer cladding adjacent to the first receiving core element $C_{R\_1}$, the second receiving core element $C_{R\_2}$ having a group refractive index $n_{R\_2}^g$ and an effective refractive index $n_{\mathit{eff}R\_2}$, wherein $n_{\mathit{eff}R\_1}$ and $n_{\mathit{eff}R\_2}$ are different. The first transmitting core element $C_{T\_1}$ may be optically coupled to the first receiving core element $C_{R\_1}$ and the second transmitting core element $C_{T\_2}$ may be optically coupled to the second receiving core element $C_{R\_2}$. The length $L_T$ of the transmitting multi-core optical fiber, the length $L_R$ of the receiving multi-core optical fiber, and the group refractive indexes of the each of the core elements satisfy the relation $(n_{T\_1}^g L_T + n_{R\_1}^g L_R) = (n_{T\_2}^g L_T + n_{R\_2}^g L_R)$.

According to another embodiment, a multi-core optical fiber interconnect includes a first multi-core optical fiber having a length $L_T$. The first multi-core optical fiber may have P core elements $C_{T\_j}$ positioned in a first common outer cladding, where j is a positive integer from 1 to P, P is greater than 1, and each core element $C_{T\_j}$ of the first multi-core optical fiber has a group refractive index $n_{T\_j}^g$ and an effective refractive index $n_{\mathit{eff}T\_j}$ which is different than an effective refractive index of adjacent core elements in the first multi-core optical fiber. The multi-core optical fiber interconnect may also have a second multi-core optical fiber having a length $L_R$. The second multi-core optical fiber may have P core elements $C_{R\_j}$ positioned in a second common outer cladding, where j is a positive integer from 1 to P, and each core element $C_{R\_j}$ of the first multi-core optical fiber has a group refractive index $n_{R\_j}^g$ and an effective refractive index $n_{\mathit{eff}R\_j}$ which is different than an effective refractive index of adjacent core elements in the second multi-core optical fiber. The first multi-core optical fiber and the second multi-core optical fiber may be positioned such that each core element $C_{T\_j}$ is optically coupled to a corresponding core element $C_{R\_j}$ to form an array of interconnect core elements. A sum $(n_{T\_j}^g L_T + n_{R\_j}^g L_R)$ of each interconnect core element is the same for each interconnect core element in the array of interconnect core elements.

Additional features and advantages of the multi-core optical fiber interconnects described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
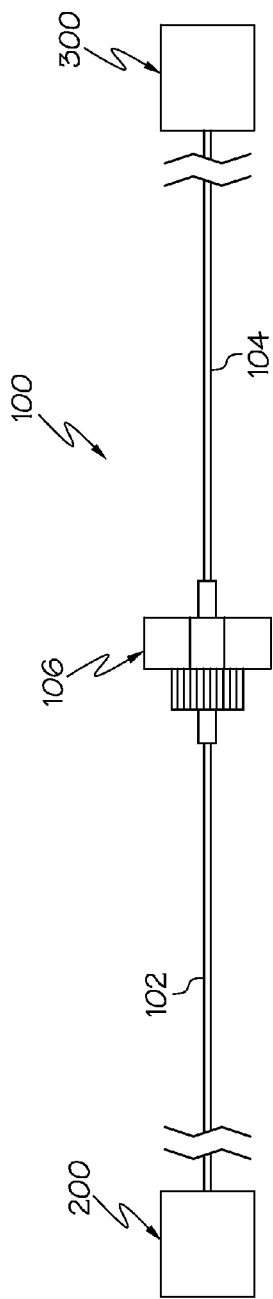
FIG. 1 schematically depicts a multi-core optical fiber interconnect according to one or more embodiments shown and described herein.

Reference will now be made in detail to embodiments of multi-core optical fiber interconnects, examples of which are illustrated in the accompanying drawings. Whenever possible, the same reference numerals will be used throughout the drawings to refer to the same or like parts. An embodiment of a multi-core optical fiber interconnect is schematically depicted in FIG. 1. In embodiments, the multi-core optical fiber interconnect may include a transmitting multi-core optical fiber having a length $L_T$. The multi-core optical fiber interconnect may also include a first transmitting core element $C_{T\_1}$ positioned in a first common outer cladding, the first transmitting core element $C_{T\_1}$ having a group refractive index $n_{T\_1}^g$ and an effective refractive index $n_{\it effT\_1}$. The transmitting mulit-core optical fiber may also include a second transmitting core element $C_{T\_2}$ positioned in the first common outer cladding adjacent to the first transmitting core element $C_{T\_1}$, the second transmitting core element $C_{T\_2}$ having a group refractive index $n_{T\_2}^g$ and an effective refractive index $n_{\it effT\_2}$, wherein $n_{\it effT\_1}$ and $n_{\it effT\_2}$ are different. The multi-core optical fiber interconnect may also include a receiving multi-core optical fiber comprising having a length $L_R$. The receiving multi-core optical fiber may have a first receiving core element $C_{R\_1}$ positioned in a second common outer cladding, the first receiving core element $C_{R\_1}$ having a group refractive index $n_{R\_1}^g$ and an effective refractive index $n_{\it effR\_1}$. The receiving multi-core optical fiber may also include a second receiving core element $C_{R\_2}$ positioned in the second common outer cladding adjacent to the first receiving core element $C_{R\_1}$, the second receiving core element $C_{R\_2}$ having a group refractive index $n_{R\_2}^g$ and an effective refractive index $n_{\it effR\_2}$, wherein $n_{\it effR\_1}$ and $n_{\it effR\_2}$ are different. The first transmitting core element $C_{T\_1}$ may be optically coupled to the first receiving core element $C_{R\_1}$ and the second transmitting core element $C_{T\_2}$ may be optically coupled to the second receiving core element $C_{R\_2}$. The length $L_T$ of the transmitting multi-core optical fiber, the length $L_R$ of the receiving multi-core optical fiber, and the group refractive indexes of the each of the core elements satisfy the relation $(n_{T\_1}^g L_T + n_{R\_1}^g L_R) = (n_{T\_2}^g L_T + n_{R\_2}^g L_R)$. Various embodiments of multi-core optical fiber interconnects will be described herein with specific reference to the appended drawings.

The phrase "refractive index profile," as used herein, refers to the relationship between refractive index or relative refractive index and the dimensions of the optical fiber or the core element of the optical fiber.

The phrase "relative refractive index," as used herein, is defined as $\Delta(r)\% = 100 \times (n(r)^2 - n_{REF}^2)/2n_i^2$, where $n_i$ is an extrema of the refractive index in region i (i.e., the minimum or maximum of the refractive index in region i), unless otherwise specified. The relative refractive index percent is measured at 1550 nm unless otherwise specified. The term $n_{REF}$ is the average refractive index of the common outer cladding of the multi-core optical fiber, which can be calculated, for example, by taking "N" index measurements $(n_{c1}, n_{c2}, \ldots n_{cN})$ of the common outer cladding (which, in some embodiments, may be undoped silica), and calculating the average refractive index by:

$$n_C = (1/N) \sum_{i=1}^{i=N} n_{Ci}$$

As used herein, the relative refractive index is represented by $\Delta n$ and its values are given in units of "%," unless otherwise specified. In cases where the refractive index of a region is less than the reference index $n_{REF}$, the relative refractive index is negative and is referred to as having a depressed region or depressed-index, and the minimum relative refractive index is calculated at the point at which the relative refractive index is most negative, unless otherwise specified. In cases where the refractive index of a region is greater than the reference index $n_{REF}$, the relative index percent is positive and the region can be said to be raised or to have a positive index.

The group refractive index is defined as the ratio of the vacuum velocity of light to the group velocity in the medium, which can be written as:

$$n^g = n + \omega \frac{dn}{d\omega},$$

where n is the refractive index and ω is the light radian frequency. The group refractive index of an optical fiber is normally measured by using interferometric methods, such as the method based on a Fabry-Perot resonator (reported in "Group effective indices of different types of optical fibers measured around 1550 nm," J. Appl. Phys., Vol. 75, No. 6, 15 Mar. 1994).

The effective refractive index can be given for a component (e.g., a waveguide) as a measure of the phase velocity of a light beam in that component, compared to the propagation of light in a vacuum. The effective refractive index $n_{eff}$ has the analogous meaning for light propagation in a waveguide; the β value (phase constant) of the waveguide (for some wavelength) is the effective index times the vacuum wave number:

$$\beta = n_{eff} \frac{2\pi}{\lambda}$$

One method to measure effective refractive index is the prism coupling technique which is described in "Phase-velocity measurements using prism output coupling for single- and few-mode optical fibers" published on OPTICS LETTERS, Vol. 11, No. 2, p. 106, 1986.

The term "α-profile" or "alpha profile" refers to a relative refractive index profile of the core elements, expressed in terms of Δ(r) which is in units of "%", where r is the radius of the core element and which follows the equation:

$$\Delta(r) \% = \Delta(r_o)(1-[|r-r_o|/(r_1-r_o)]^\alpha),$$

where $r_o$ is the point at which Δ(r) is maximum, $r_1$ is the point at which Δ(r) % is zero with respect to the common outer cladding, and r is in the range $r_i \le r \le r_f$, where Δ is defined as above, $r_i$ is the initial point of the α-profile, $r_f$ is the final point of the α-profile, and α is an exponent which is a real number. For a profile segment beginning at the centerline of a core element (i.e., r=0), the α-profile has the simpler form $$\Delta(r) \% = \Delta(0)(1-[|r|/(r_1)]^\alpha),$$

where Δ(0) is the refractive index delta at the centerline of the core element. An α of one corresponds to a triangular profile, and an α of 2 describes a parabolic profile. When α is greater than 10, the profile is practically a step-index profile.

Mode field diameter (MFD) is a measure of the spot size or beam width of light propagating in a single mode fiber. Mode-field diameter is function of the source wavelength, fiber core radius and fiber refractive index profile, MFD is measured using the Peterman II method where $$MFD = 2w, \text{ and } w^2 = 2 \frac{\int_0^\infty E^2 r \, dr}{\int_0^\infty \left(\frac{dE}{dr}\right)^2 r \, dr}$$

where E is the electric field distribution in the fiber and r is the radial coordinate of the fiber The cutoff wavelength is the minimum wavelength at which an optical fiber will support only one propagating mode. If the operative wavelength is below the cutoff wavelength, multimode operation may take place and the introduction of additional sources of dispersion may limit a fiber's information carrying capacity. A mathematical definition can be found in Single Mode Fiber Optics, Jeunhomme, pp. 39 44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The cutoff wavelength may be measured using a transmitted power technique such as the technique described in TIA-455-80B entitled "Measurement Cut-off Wavelength of Uncabled Single-mode Fiber By Transmitted Power."

The effective area of a fiber is the area of the fiber in which light is propagated and is defined as:

$$A_{eff} = 2\pi \frac{\left(\int_0^\infty E^2 r \, dr\right)^2}{\int_0^\infty E^4 r \, dr},$$

where E is the electric field associated with light propagated in the fiber and r is the radial coordinate of the fiber.

All wavelength-dependent optical properties (such as cutoff wavelength, etc.) are reported herein for the wavelength specified.

The term "crosstalk" in a multi-core fiber is a measure of how much power leaks from one core to another, adjacent core. The crosstalk depends on the refractive index profile of the core and the distance between adjacent cores. One way to model the crosstalk is to use the coupled mode theory assuming two perfect (defect-free) identical cores (core 1 and core 2) separated by a distance D. Light is launched into core 1 with a power $P_0$. The power transmitted in each of the cores (i.e., $P_1$ transmitted in core 1 and $P_2$ transmitted in core 2) changes sinusoidally. The power crosstalk from core 1 to core 2 (in dB) can be calculated using the equation:

$$X = 10\log\left(\frac{P_2}{P_0}\right) = 10\log\left(\frac{\kappa^2}{g^2}\sin^2(gz)\right)$$

where z is the propagation distance, κ is the coupling coefficient, Δβ is the mismatch in propagation constant between the modes in each of the cores when they are isolated, and g is a parameter depending on κ and Δβ:

$$g^2 = \kappa^2 + \left(\frac{\Delta\beta}{2}\right)^2$$

The crosstalk depends on the coupling coefficient κ which, in turn, depends on the refractive index of the core and distance between the cores, and Δβ that depends on the difference in refractive index profile between the two cores. According to these equations, the one factor which can be utilized to reduce the crosstalk is the coupling coefficient. The coupling coefficient depends on the overlap integral of electrical fields of the fundamental modes guided in the adjacent cores. Increasing the distance between the cores reduces the coupling coefficient but results in a lower packing density of cores in the fiber. Another factor is the mismatch in the propagation constant $\Delta\beta$ between the two cores. A small mismatch effectively reduces the maximum power that can be transferred from one core to another core. Therefore a heterogeneous core design (i.e., non-identical cores) can have lower crosstalk than homogeneous core design (i.e., identical cores).

For a homogeneous multi-core optical fiber, $\Delta\beta$ due to random perturbations in the fiber can be much stronger than the coupling coefficients and constant phase can only be maintained in a short length of fiber, i.e. the correlation length of the fiber $\Delta L$. For a long length of fiber under straight deployment conditions or with a large bend diameter, the crosstalk X is proportional to the fiber length L and the average correlation length $\Delta L$:

$$X = 2\kappa^2 L \Delta L$$

For a heterogeneous multi-core fiber design, the $\Delta\beta$ between the two cores may be designed to be much larger than the $\Delta\beta$ due to random perturbation. In this case, the crosstalk is proportional to the fiber length L and inversely proportional to the average correlation length $\Delta L$:

$$X = \frac{1}{2}\left(\frac{\kappa}{g}\right)^2 \frac{L}{\Delta L}$$

Referring now to FIG. 1, a multi-core optical fiber interconnect 100 is schematically depicted according to one or more embodiments described herein. The multi-core optical fiber interconnect 100 is utilized to optically couple the output of an optical transmitter array 200 to an optical receiver array 300 such that optical signals output from the optical transmitter array 200 propagate through the multi-core optical fiber interconnect 100 and are received in the optical receiver array 300. The multi-core optical fiber interconnect 100 generally includes a transmitting multi-core optical fiber 102 having a length $L_T$ and a receiving multi-core optical fiber 104 having a length $L_R$. In the embodiments described herein, the length $L_T$ may be the same as or different than the length $L_R$. The transmitting multi-core optical fiber 102 is joined to the receiving multi-core optical fiber 104 with a coupler 106 or by splicing such that the transmitting core elements (FIG. 2) of the transmitting multi-core optical fiber 102 are optically coupled to corresponding receiving core elements (FIG. 3) of the receiving multi-core optical fiber 104, thereby forming an array of interconnected core elements extending along the entire length (i.e., $L_T + L_R$) of the multi-core optical fiber interconnect. Accordingly, each interconnected core element of the array of core elements includes a transmitting core element of the transmitting multi-core optical fiber and a receiving core element of the receiving multi-core optical fiber such that an optical signal introduced into a transmitting core element propagates along the length $L_T$ of the transmitting multi-core optical fiber and into the corresponding receiving core element of the receiving multi-core optical fiber, eventually propagating the entire length of the multi-core optical fiber interconnect 100. The coupler 106 utilized to join the transmitting multi-core optical fiber 102 and the receiving multi-core optical fiber 104 may be a conventional fiber connector, mechanical splice, or a fusion splice.

Figure 2:
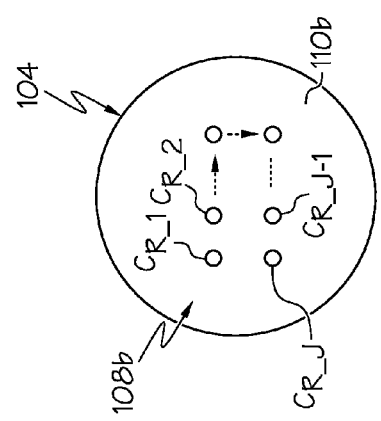
FIG. 2 schematically depicts a cross section of a receiving multi-core optical fiber of the multi-core optical fiber interconnect of FIG. 1 according to one or more embodiments shown and described herein.
Figure 3:
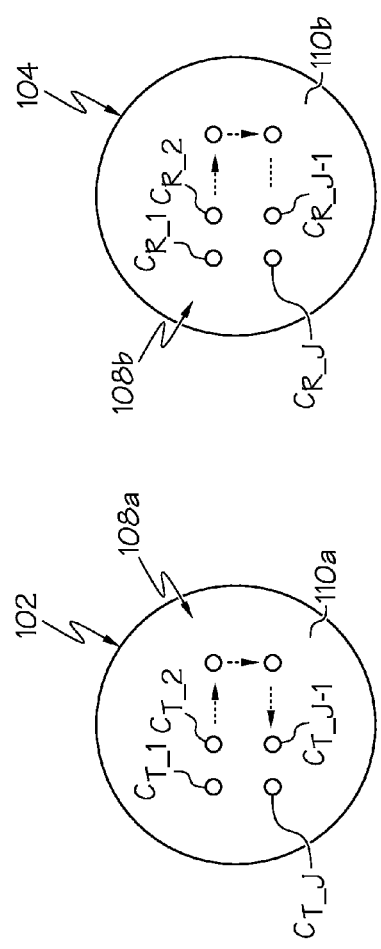
FIG. 3 schematically depicts a cross section of a receiving multi-core optical fiber of the multi-core optical fiber interconnect of FIG. 1 according to one or more embodiments shown and described herein.

Referring now to FIGS. 2 and 3, cross sections of embodiments of the transmitting multi-core optical fiber 102 and the receiving multi-core optical fiber 104 are schematically depicted. Each of the transmitting multi-core optical fiber 102 and the receiving multi-core optical fiber 104 comprise an array of core elements 108a, 108b arranged in a common outer cladding 110a, 110b. The arrays of core elements 108a, 108b are oriented in the respective common outer claddings 110a, 110b such that the long axes of the core elements are generally parallel with one another.

In the embodiments of multi-core optical fibers depicted in FIGS. 2 and 3, the arrays of core elements 108a, 108b include rows of core elements arranged in a rectangular matrix. Each array of core elements 108a, 108b contains P core elements where P is an integer greater than or equal to 2. The maximum number of core elements in each array is less than or equal to $((D-2)/20)-1$, where D is the fiber outer diameter in μm. Accordingly, it should be understood that the array of core elements 108a in the transmitting multi-core optical fiber 102 includes at least two transmitting core elements and the array of core elements 108b in the receiving multi-core optical fiber 104 includes at least two receiving core elements. It should also be understood that the number of core elements in each of the transmitting multi-core optical fiber 102 and the receiving multi-core optical fiber 104 is the same such that each core element in the transmitting multi-core optical fiber 102 is coupled to a corresponding core element in the receiving multi-core optical fiber 104.

In the embodiments of the multi-core optical fiber interconnects 100 described herein, the transmitting core elements of the transmitting multi-core optical fiber 102 are identified as "transmitting core element $C_{T\_j}$" where "T" denotes the core element is a transmitting core element and "j" is an integer from 1 to P, indicating a specific core element in the array of core elements 108a. For example, for a transmitting multi-core optical fiber 102 where P=2 (i.e., a transmitting multi-core optical fiber with 2 core elements), the core elements within the transmitting multi-core optical fiber 102 are identified as "transmitting core element $C_{T\_1}$" and "transmitting core element $C_{T\_2}$."

Similarly, in the embodiments of the multi-core optical fiber interconnects 100 described herein, the receiving core elements of the receiving multi-core optical fiber 104 are identified as "receiving core element $C_{R\_j}$" where "R" denotes the core element is a receiving core element and "j" is an integer from 1 to P, indicating a specific core element in the array of core elements 108b. For example, for a receiving multi-core optical fiber 104 where P=2 (i.e., a receiving multi-core optical fiber with 2 core elements), the core elements within the receiving multi-core optical fiber 104 are identified as "receiving core element $C_{R\_1}$" and "receiving core element $C_{R\_2}$."

The aforementioned identification convention is also utilized to indicate the interconnectivity between the transmitting core elements $C_{T\_j}$ of the transmitting multi-core optical fiber 102 and the receiving core elements $C_{R\_j}$ of the receiving multi-core optical fiber 104. Specifically, each transmitting core element $C_{T\_j}$ is optically coupled to a corresponding receiving core element $C_{R\_j}$ having the same "j" value. For example, transmitting core element $C_{T\_1}$ is optically coupled to receiving core element $C_{R\_1}$.

While the embodiments of the transmitting multi-core optical fiber 102 and the receiving multi-core optical fiber 104 are depicted in FIGS. 2 and 3 as containing rectangular arrays 108a, 108b of core elements, it should be understood that other configurations are possible and contemplated. For example, the core elements may be arranged in a staggered array in which rows of core elements are laterally offset from one another such that the core elements of adjacent rows are not aligned in a single column. Alternatively, the core elements may be arranged in a series of concentric circles of which increase in diameter from the center of each multi-core optical fiber.

In the embodiments described herein, adjacent core elements in each of the transmitting multi-core optical fiber 102 and the receiving multi-core optical fiber 104 are spaced apart by a distance dr measured from the center of one core element to the center of an adjacent core element. For example, in FIG. 2, transmitting core element $C_{T\_1}$ is spaced apart from transmitting core element $C_{T\_2}$ by dr. Similarly, transmitting core element $C_{T\_1}$ is spaced apart from transmitting core element $C_{T\_j}$ by dr. In the embodiments described herein, the distance dr depends on the overall length of the multi-core optical fiber interconnect. For example, when the overall length of the multi-core optical fiber interconnect is less than about 2 km, the distance dr between adjacent core elements is greater than or equal to about 20 µm. However, for lengths greater than about 2 km, the distance dr between adjacent core elements may be greater than or equal to 25 µm, such as greater than or equal to about 30 µm.

Still referring to FIGS. 2 and 3, the common outer cladding 110a, 110b is formed from silica-based glass ($SiO_2$) with an index of refraction $n_{c1}$. The index of refraction $n_{c1}$ of the common outer cladding is generally less than the index of refraction of the core elements in the corresponding array of core elements 108a, 108b. In some embodiments the common outer cladding 110a, 110b is substantially free from dopants or contaminants which would alter the index of refraction of the common outer cladding 110a, 110b including, without limitation, up-dopants (i.e., germanium and the like) and down-dopants (i.e., boron, fluorine and the like). The term "substantially free," as used herein, means that the common outer cladding 110a, 110b does not contain any constituent components intentionally added to the glass of the common outer cladding 110a, 110b but may contain impurities or "tramp" contaminants in an amount less than or equal to about 0.1 wt. %. In other embodiments, the common outer cladding 110a, 110b may comprise one or more up-dopants which increase the refractive index of the silica glass, or one or more down-dopants which decreases the refractive index of the silica glass, so long as the index of refraction $n_{c1}$ of the common outer cladding is less than the index of refraction of the core elements in the corresponding array of core elements 108a, 108b.

The core elements $C_{T\_j}$ of the transmitting multi-core optical fiber 102 each have a radius $r_{T\_j}$, a maximum index of refraction $n_{T\_j}$, a relative refractive index $\Delta_{T\_j}$ relative to the common outer cladding 110, a group refractive index $n_{T\_j}{}^g$, an effective refractive index $n_{effT\_j}$, and a mode field diameter $MFD_{T\_j}$, where the subscript "T" denotes the core element is in the transmitting multi-core optical fiber 102 and the subscript "j" is an integer value denoting a specific transmitting core element within the transmitting multi-core optical fiber 102. The core elements $C_{R\_j}$ of the receiving multi-core optical fiber 104 each have a radius $r_{R\_j}$, a maximum index of refraction $n_{R\_j}$, a relative refractive index $\Delta_{R\_j}$ relative to the common outer cladding 110, a group refractive index $n_{R\_j}{}^g$, an effective refractive index $n_{effR\_j}$, and a mode field diameter $MFD_{R\_j}$, where the subscript "R" denotes the core element is in the receiving multi-core optical fiber 104 and the subscript "j" is an integer value denoting a specific receiving core element within the receiving multi-core optical fiber 104.

In the embodiments described herein, the core elements $C_{T\_j}$ of the transmitting multi-core optical fiber 102 and the core elements $C_{R\_j}$ of the receiving multi-core optical fiber 104 are single mode core elements.

The core elements $C_{T\_j}$ of the transmitting multi-core optical fiber 102 and the core elements $C_{R\_j}$ of the receiving multi-core optical fiber 104 are generally formed from silica-based glass. In the embodiments described herein, the silica-based glass of the core elements is doped with one or more dopants which increases the index of refraction of the core elements. For example, the core elements may comprise silica-based glass doped with germanium such as when the core elements comprise silica ($SiO_2$) glass up-doped with germania ($GeO_2$). However, it should be understood that dopants other than germania may be utilized in the core elements, including, without limitation, $TiO_2$, $ZrO_2$, $Nb_2O_5$ and/or $Ta_2O_5$. Such dopants may be incorporated in the core elements $C_{T\_j}$, $C_{R\_j}$ either individually or in combination in order to obtain the desired index of refraction $n_{T\_j}$, $n_{R\_j}$ and relative refractive index $\Delta_{T\_j}$, $\Delta_{R\_j}$. In embodiments, the core elements may comprise from about 3.2 wt. % to about 40 wt. % $GeO_2$. For example, in some embodiments, the core elements may comprise from about 5.0 wt. % to about 16 wt. % $GeO_2$, more preferably from about 5.5 wt. % to about 10.0 wt. % $GeO_2$, and, most preferably, from about 5.5 wt. % to about 8.0 wt. % $GeO_2$, which increases the index of refraction $n_{T\_j}$, $n_{R\_j}$ of the core elements relative to undoped silica glass. In embodiments, the relative refractive index $\Delta_{T\_j}$, $\Delta_{R\_j}$ of the core elements relative to the common outer cladding is greater than or equal to 0.2%. For example, in some embodiments, the relative refractive index $\Delta_{T\_j}$, $\Delta_{R\_j}$ of the core elements relative to the common outer cladding is greater than or equal to about 0.2% and less than or equal to about 0.5%, preferably greater than or equal to about 0.3% and less than or equal to about 0.4%.

In the embodiments described herein the group refractive index $n^g$ of the core elements $C_{T\_j}$, $C_{R\_j}$ is typically greater than or equal to about 1.463 at a wavelength of 1550 nm. For example, in some embodiments the group refractive index $n^g$ of the core elements $C_{T\_j}$, $C_{R\_j}$ is in a range from greater than or equal to 1.463 and less than or equal to 1.479 at 1550 nm.

In the embodiments described herein the effective refractive index $n_{eff}$ of the core elements $C_{T\_j}$, $C_{R\_j}$ is typically greater than or equal to about 1.4445 at a wavelength of 1550 nm. For example, in some embodiments the effective refractive index $n_{eff}$ of the core elements $C_{T\_j}$, $C_{R\_j}$ is in a range from greater than or equal to 1.4445 and less than or equal to 1.448 at 1550 nm.

In embodiments, the core elements may have a cutoff wavelength that is less than or equal to about 1550 nm. In some of these embodiments, the core elements may have a cutoff wavelength that is less than or equal to 1310 nm. In embodiments, the core elements may have mode field diameters $MFD_{T\_j}$, $MFD_{R\_j}$ in a range from greater than or equal to about 6 µm and less than or equal to about 15 µm, preferably from about 8 µm to about 12 µm. In some embodiments, the core elements may have effective areas $A_{effT\_j}$, $A_{effR\_j}$ from greater than or equal to about 28 µm$^2$ and less than or equal to about 180 µm$^2$, preferably from greater than or equal to about 55 µm$^2$ and less than or equal to 150 µm$^2$.

In the embodiments described herein, the core elements $C_{T\_j}$, $C_{R\_j}$ generally have radii r in the range from greater than or equal to about 3 µm to less than or equal to about 35

μm such that the core elements are single-moded. For example, when the core elements $C_{T\_j}$, $C_{R\_j}$ may have radii r in the range from greater than or equal to about 3 μm to less than or equal to about 9 μm, more preferably from greater than or equal to about 4 μm to less than or equal to about 6 μm. In some of these embodiments, the core elements may be single-moded at wavelengths greater than or equal to about 800 nm.

Figure 4:
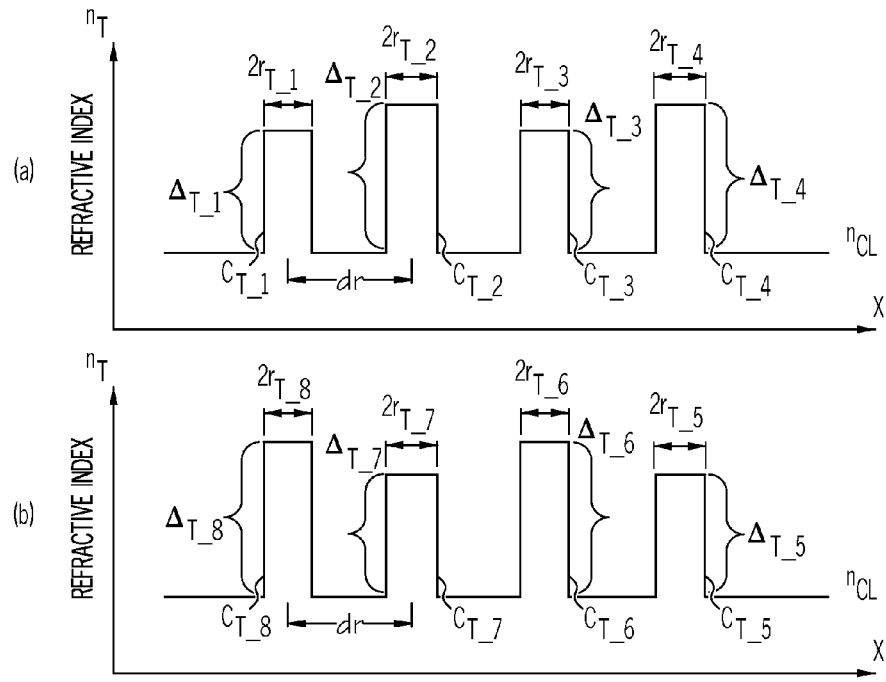
FIG. 4 graphically depicts a refractive index profile of one embodiment of a transmitting multi-core optical fiber.

In the embodiments described herein, the core elements $C_{T\_j}$, $C_{R\_j}$ may have a step-index refractive index profile or a graded-index refractive index profile (also referred to herein as an α-profile). For example, FIG. 4 schematically depicts the refractive index profile of a transmitting multi-core optical fiber in which each of the core elements has a step-index refractive index profile. In other embodiments, the core elements $C_{T\_j}$, $C_{R\_j}$ may have a graded index, such as an α-profile, as is graphically depicted in the refractive index profile of FIG. 8 which includes core elements with step-index refractive index profiles and α-profiles. In embodiments where the core elements have α-profiles, an α-value defines the index of refraction of the core element as a function of the radius of the element. In embodiments where the core elements have α-profiles, the α-value of the α-profile may be in a range from about 1.9 to about 2.2.

Figure 11:
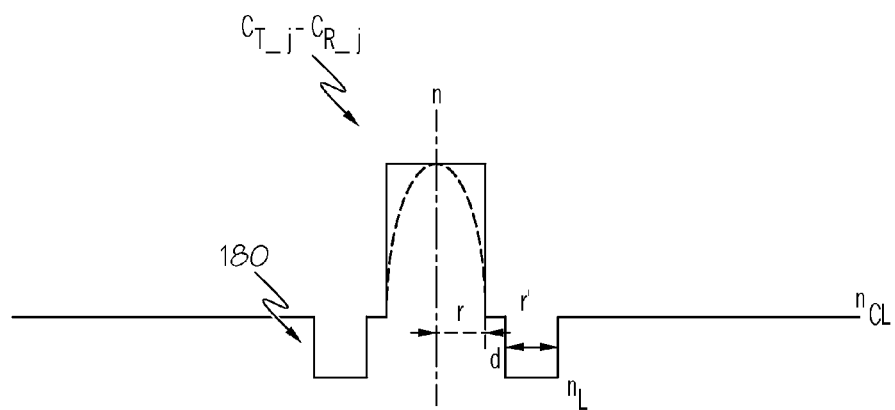
FIG. 11 graphically depicts a refractive index profile of a core element (transmitting or receiving) which includes a low index trench position around the core element.

Referring now to FIGS. 2 and 11, in some embodiments, the core elements $C_{T\_j}$, $C_{R\_j}$ may further comprise a low-index annulus 180 which surrounds the core element. The low-index annulus 180 generally has an index of refraction $n_L$ and a radial width r' greater than or equal to about 1 μm and less than or equal to about 12 μm, preferably greater than or equal to about 3 μm and less than or equal to about 6 μm. The index of refraction $n_L$ of the low-index annulus 180 is such that $n_L \leq n_{c1} \leq n_{T\_j}$ and $n_{R\_j}$ which yields a refractive index profile as depicted in FIG. 11. In some embodiments, the low-index annulus 180 may comprise silica glass down-doped with fluorine. For example, the low-index annulus 180 may comprise from about 0.36 wt. % to about 3.0 wt. % fluorine, more preferably from about 0.72 wt. % to about 2.5 wt. % fluorine, and most preferably, from about 1.4 wt. % to about 2.0 wt. % fluorine. For example, in some embodiments, the relative refractive index $\Delta_L$ of the low-index annulus 180 relative to the common outer cladding is less than or equal to about −0.1%. In some embodiments, the relative refractive index percent $\Delta_L$ of the low-index annulus 180 relative to the common outer cladding may be greater than or equal to about −0.7%. For example, in some embodiments, the relative refractive index $\Delta_L$ of the low-index annulus 180 is greater than or equal to about −0.7% and less than or equal to about −0.1%. In some other embodiments, the relative refractive index $\Delta_L$ of the low-index annulus 180 is greater than or equal to about −0.5% and less than or equal to about −0.3%. In some embodiments, the low-index annulus may be positioned in direct contact with the corresponding core element. In other embodiments, the low-index annulus may be spaced apart from the corresponding core element $C_{T\_j}$, $C_{R\_j}$ by an offset spacing d. The offset spacing d may generally be in the range from greater than 0 μm to less than or equal to about 5 μm. In embodiments, the offset spacing d may generally be in the range from greater than or equal to about 3 μm to less than or equal to about 5 μm. The low-index annuli 180 generally reduce the crosstalk between adjacent core elements and facilitate spacing adjacent core elements closer together than adjacent core elements which do not have low-index annuli without increasing the amount of crosstalk between the adjacent core elements. Accordingly, in some embodiments described herein, core elements with low-index annuli may be utilized to decrease the spacing between adjacent core elements.

Figure 10:
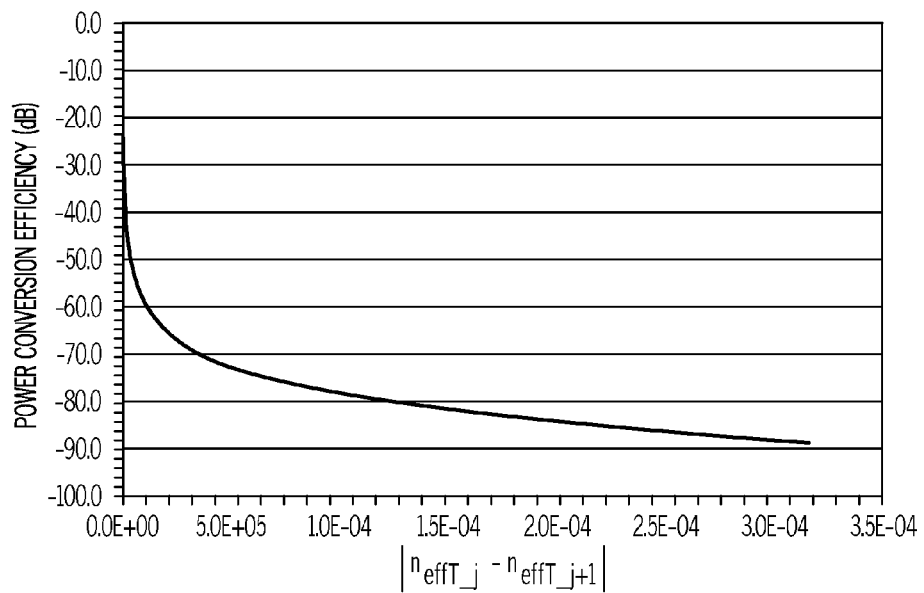
FIG. 10 graphically depicts the power conversion efficiency (y-axis) as function of the effective refractive index $n_{\it eff}$ between a transmitting core element and a receiving core element in a multi-core optical fiber interconnect.

In the embodiments described herein, the transmitting multi-core optical fiber 102 and the receiving multi-core optical fiber 104 are heterogeneous multi-core optical fibers in which any two adjacent core elements have different effective indexes of refraction. Forming the multi-core optical fibers such that adjacent cores have different effective indexes of refraction prevents phase-matching coupling between the cores, thereby suppressing crosstalk. More specifically, FIG. 10 graphically depicts the coupling efficiency (i.e., the crosstalk) on the y-axis as a function of the difference in the effective index of refraction between two adjacent core elements (e.g., $|n_{effT\_j} - n_{effT\_j+1}|$). As shown in FIG. 10, the coupling efficiency/crosstalk between the two core elements is maximized when the difference in the effective index of refraction is zero and decreases as the difference in the effective index of refraction increases. Accordingly, the effective index of refraction of the two adjacent core elements should be different (e.g., $|n_{effT\_j} - n_{effT\_j+1}| \neq 0$) to reduce the crosstalk between two adjacent core elements.

Considering that the multi-core optical fibers (transmitting and receiving) described herein each contain at least two core elements per fiber (i.e., P≥2) with the first two core elements being adjacent to one another, the first transmitting core element $C_{T\_1}$ of the transmitting multi-core optical fiber has an effective index of refraction $n_{effT\_1}$ which is different than the effective index of refraction $n_{effT\_2}$ of the second transmitting core element $C_{T\_2}$ in order to mitigate crosstalk between the adjacent core elements. Similarly, the first receiving core element $C_{R\_1}$ of the receiving multi-core optical fiber has an effective index of refraction $n_{effR\_1}$ which is different than the effective index of refraction $n_{effR\_2}$ of the second transmitting core element $C_{R\_2}$ in order to mitigate crosstalk between the adjacent core elements.

In the embodiments described herein, adjacent core elements are formed such that the crosstalk between is minimized. In some embodiments, the crosstalk between adjacent core elements is less than −30 dB, preferably less than −35 dB, and even more preferably less than −40 dB. In embodiments, reduced crosstalk between adjacent core elements may be achieved by forming the core elements such that the difference in the effective index of refraction of the core elements is greater than or equal to about $0.2 \times 10^{-4}$ in order to reduce crosstalk between the core elements. For example, in some embodiments, the difference in the effective index of refraction of the core elements is greater than or equal to about $1.0 \times 10^{-4}$ or even greater than or equal to about $1.0 \times 10^{-3}$ in order to reduce crosstalk between the core elements.

As noted hereinabove, the effective index of refraction of a core element is dependent upon several factors, including the relative refractive index Δ of the core element as determined relative to the common outer cladding and the radius r of the core element. The effective refractive index of a core element (transmitting or receiving) is also dependent on the refractive index profile of the core element (i.e., whether the core element has a graded-index refractive index profile or a step-index profile). These properties of both the transmitting core elements $C_{T\_j}$ and the receiving core elements $C_{R\_j}$ may be varied during manufacture to achieve the desired effective refractive indexes $n_{effT\_j}$ (or $n_{effR\_j}$) and $n_{effT\_j+1}$ ($n_{effR\_j+1}$) in order to minimize or mitigate crosstalk between two neighbor core elements in the multi-core optical fiber interconnect.

In the embodiments described herein, the difference in relative refractive index Δ between two adjacent core elements is greater than or equal to 0.01%, preferably greater than or equal to 0.02% or even greater than or equal to 0.04%. For example, adjacent transmitting core elements $C_{T\_1}$ and $C_{T\_2}$ may have relative refractive indexes of $\Delta_{T\_1}$ and $\Delta_{T\_2}$, respectively, and the difference between $\Delta_{T\_1}$ and $\Delta_{T\_2}$ (i.e., $|\Delta_{T\_1}-\Delta_{T\_2}|$) may be greater than or equal to 0.01% in order to reduce the crosstalk between the adjacent core elements. The same holds true for adjacent receiving core elements.

While controlling the effective refractive index between two adjacent core elements is effective for reducing the crosstalk between adjacent core elements, the difference in the effective refractive index of the adjacent core elements may also introduce a time delay between optical signals propagating in each of the core elements. In the embodiments described herein, the core elements in each of the transmitting multi-core optical fiber 102 and the receiving multi-core optical fiber 104 are formed to not only reduce crosstalk, but to also mitigate optical signal time delays between adjacent interconnect core elements (i.e., the interconnect core elements formed by optically coupled transmitting core element $C_{T\_j}$ with receiving core element $C_{R\_j}$) over the length of the multi-core optical fiber interconnect.

Specifically, the propagating time $T_n$ of an optical pulse in the $j^{th}$ core of a multi-core optical fiber interconnect formed from a transmitting multi-core optical fiber and a receiving multi-core optical fiber can be written as:

$$T_n = (n_{T\_j}^g L_T + n_{R\_j}^g L_R)/c,$$

where $n_{T\_j}^g$ and $n_{R\_j}^g$ are the group indexes of refraction of the jth core in the transmitting multi-core optical fiber and the receiving multi-core optical fiber, respectively, $L_T$ is the length of the transmitting multi-core optical fiber, and $L_R$ is the length of the receiving core optical fiber, and c is the speed of light in vacuum.

In order to mitigate the optical signal time delay between optical pulses in different core elements within the multi-core optical fiber interconnect, the group index of refraction of the individual core elements and the length of each of the transmitting multi-core optical fiber and the receiving multi-core optical fiber should be selected such that the sum $$(n_{T\_j}^g L_T + n_{R\_j}^g L_R)$$

is substantially equal for each pair of optically coupled core elements (i.e., a transmitting core element $C_{T\_j}$ optically coupled to a receiving core element $C_{R\_j}$). For example, in embodiments where each of the transmitting multi-core optical fiber and the receiving multi-core optical fiber have two core elements (i.e., P=2), $(n_{T\_1}^g L_T + n_{R\_1}^g L_R) = (n_{T\_2}^g L_T + n_{R\_2}^g L_R)$.

In some embodiments, the length $L_T$ of the transmitting multi-core optical fiber is different than the length $L_R$ of the receiving multi-core optical fiber. Furthermore, in the embodiments described herein, the effective index of refraction $n_{eff}$ of adjacent core elements (such as adjacent transmitting core elements $C_{T\_1}$ and $C_{T\_2}$ or adjacent receiving core elements $C_{R\_1}$ and $C_{R\_2}$) are different in order to minimize crosstalk between adjacent core elements, as noted above. In addition, each transmitting core element $C_{T\_j}$ of the transmitting multi-core optical fiber and each receiving core element $C_{R\_j}$ of the receiving multi-core optical fiber are formed with group refractive indexes $n_{T\_j}^g$ and $n_{R\_j}^g$ such that, when each transmitting core element $C_{T\_j}$ is optically coupled to a corresponding receiving core element $C_{R\_j}$ to form an interconnect core element of the multi-core optical fiber interconnect, the relationship $(n_{T\_j}^g L_T + n_{R\_j}^g L_R) = (n_{T\_j+1}^g L_T + n_{R\_j+1}^g L_R)$ is satisfied and optical signal time delays amongst the interconnect core elements are minimized or mitigated.

In embodiments, the group refractive index $n_{T\_j}^g$ of each transmitting core element is different than the group refractive index $n_{R\_j}^g$ of the receiving core element to which the transmitting core element is coupled. For example, in embodiments where the transmitting multi-core optical fiber and the receiving multi-core optical fiber each comprise two core elements, the group refractive index $n_{T\_1}^g$ of the first transmitting core element $C_{T\_1}$ is different than the group refractive index $n_{R\_1}^g$ of the first receiving core element $C_{R\_1}$. Similarly, the group refractive index $n_{T\_2}^g$ of the second transmitting core element $C_{T\_2}$ is different than the group refractive index $n_{R\_2}^g$ of the second receiving core element $C_{R\_2}$.

As noted hereinabove, the group refractive index $n^g$ of a core element (transmitting or receiving) is dependent on the properties of the core element including the refractive index n of the core element and the radius r of the core element. The group refractive index $n^g$ of a core element (transmitting or receiving) is also dependent on the refractive index profile of the core element (i.e., whether the core element has a graded-index refractive index profile or a step-index profile). These properties of both the transmitting core elements $C_{T\_j}$ and the receiving core elements $C_{R\_j}$ may be varied during manufacture to achieve the desired group refractive indexes $n_{T\_j}^g$ and $n_{R\_j}^g$ in order to minimize or mitigate optical signal time delays amongst core elements in the multi-core optical fiber interconnect.

Figure 5:
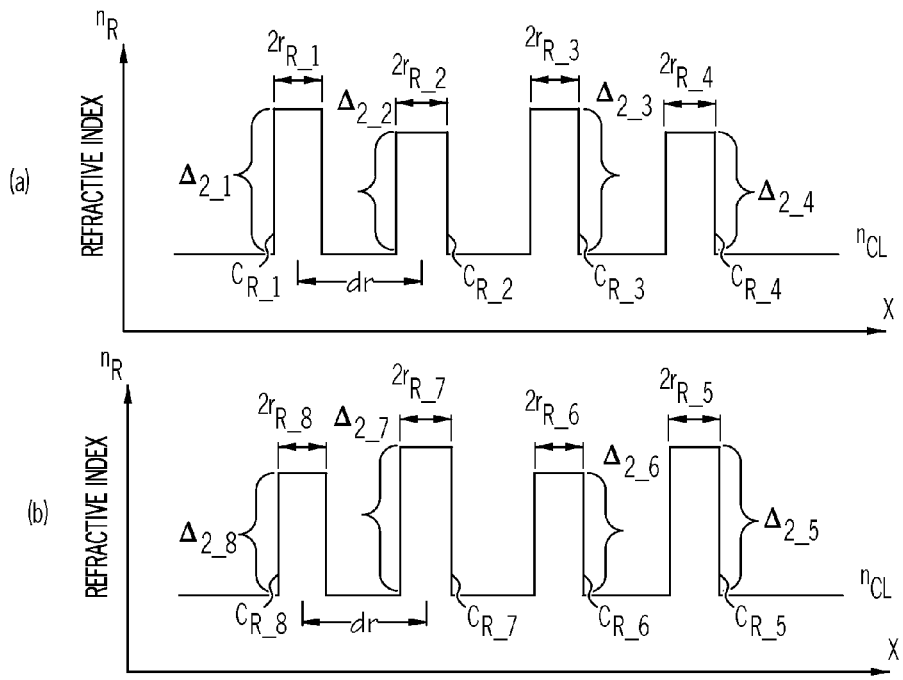
FIG. 5 graphically depicts a refractive index profile of one embodiment of a receiving multi-core optical fiber for use with the transmitting multi-core optical fiber of FIG. 4 and in which the relative refractive index of each receiving core element is different than the relative refractive index of the corresponding transmitting core element.

In some embodiments described herein, the relative refractive indexes $\Delta_{T\_j}$ of the transmitting core elements $C_{T\_j}$ are different than the relative refractive indexes $\Delta_{R\_j}$ of the receiving core elements $C_{R\_j}$ to which they are coupled in order to achieve the desired group refractive indexes $n_{T\_j}^g$ and $n_{R\_j}^g$ and minimize or mitigate optical signal time delays amongst core elements of the multi-core optical fiber interconnect. Referring to FIGS. 4 and 5 by way of example, the refractive index profile of a transmitting multi-core optical fiber 102 is graphically depicted in FIG. 4 and the refractive index profile of a receiving multi-core optical fiber 104 is schematically depicted in FIG. 5. Each of the transmitting multi-core optical fiber 102 and the receiving multi-core optical fiber 104 contain eight core elements (i.e., P=8) arranged in two rows of four core elements. As shown in FIGS. 4 and 5, the relative refractive index $\Delta_{T\_j}$ of each transmitting core element $C_{T\_j}$ in the transmitting multi-core optical fiber 102 is different than the relative refractive index $\Delta_{R\_j}$ of the corresponding receiving core element $C_{R\_j}$ in the receiving multi-core optical fiber 104 to which it is coupled. For example, the relative refractive index $\Delta_{T\_2}$ of transmitting core element $C_{T\_2}$ in the transmitting multi-core optical fiber 102 is different than the relative refractive index $\Delta_{R\_2}$ of the corresponding receiving core element $C_{R\_2}$ in the receiving multi-core optical fiber 104 to which it is coupled. Similarly, the relative refractive index $\Delta_{T\_8}$ of transmitting core element $C_{T\_8}$ in the transmitting multi-core optical fiber 102 is different than the relative refractive index $\Delta_{R\_8}$ of the corresponding receiving core element $C_{R\_8}$ in the receiving multi-core optical fiber 104 to which it is coupled.

In addition, adjacent core elements in each of the transmitting multi-core optical fiber 102 and the receiving multi-core optical fiber 104 have different relative refractive indexes. For example, transmitting core element $C_{T\_3}$ of the transmitting multi-core optical fiber 102 has a relative refractive index $\Delta_{T\_3}$ which is different than the relative refractive index $\Delta_{T\_2}$ of transmitting core element $C_{T\_2}$, the relative refractive index $\Delta_{T\_4}$ of transmitting core element $C_{T\_4}$, and the relative refractive index $\Delta_{T\_6}$ of transmitting core element $C_{T\_6}$. Similarly, receiving core element $C_{R\_3}$ of the receiving multi-core optical fiber 104 has a relative refractive index $\Delta_{R\_3}$ which is different than the relative refractive index $\Delta_{R\_2}$ of receiving core element $C_{R\_2}$, the relative refractive index $\Delta_{R\_4}$ of receiving core element $C_{R\_4}$, and the relative refractive index $\Delta_{R\_6}$ of receiving core element $C_{R\_6}$. In this embodiment, varying the relative refractive index between adjacent core elements of both the transmitting multi-core optical fiber 102 and the receiving multi-core optical fiber 104 reduces the crosstalk between adjacent core elements while varying the relative refractive index between the transmitting core elements $C_{T\_j}$ of the transmitting multi-core optical fiber 102 and the corresponding receiving core elements $C_{R\_j}$ of the receiving multi-core optical fiber 104 reduces or mitigates optical signal time delays between adjacent interconnect core elements formed by the coupling of the transmitting core elements $C_{T\_j}$ to the corresponding receiving core elements $C_{R\_j}$.

Considering that the multi-core optical fibers (transmitting and receiving) described herein each contain at least two core elements per fiber (i.e., P≥2) with the first two core elements being adjacent to one another, the first transmitting core element $CT_{\_1}$ of the transmitting multi-core optical fiber has a relative refractive index $\Delta_{T\_1}$ and the first receiving core element $C_{R\_1}$ of the receiving multi-core optical fiber has a relative refractive index $\Delta_{R\_1}$ which is different than the relative refractive index $\Delta_{T\_1}$ of the first transmitting core element $C_{T\_1}$ to which it is coupled in order to reduce or mitigate optical signal time delays. Similarly, the second transmitting core element $C_{T\_2}$ of the transmitting multi-core optical fiber has a relative refractive index $\Delta_{T\_2}$ and the second receiving core element $C_{R\_2}$ of the receiving multi-core optical fiber has a relative refractive index $\Delta_{R\_2}$ which is different than the relative refractive index $\Delta_{T\_2}$ of the second transmitting core element $C_{T\_2}$ in order to reduce or mitigate optical signal time delays. In addition, $\Delta_{T\_1}$ of the first transmitting core element $C_{T\_1}$ is different than $\Delta_{T\_2}$ of the second transmitting core element $C_{T\_2}$ and $\Delta_{R\_1}$ of the first receiving core element $C_{T\_2}$ is different than $\Delta_{R\_2}$ of the second receiving core element $C_{R\_2}$ to reduce crosstalk between the adjacent core elements.

Figure 6:
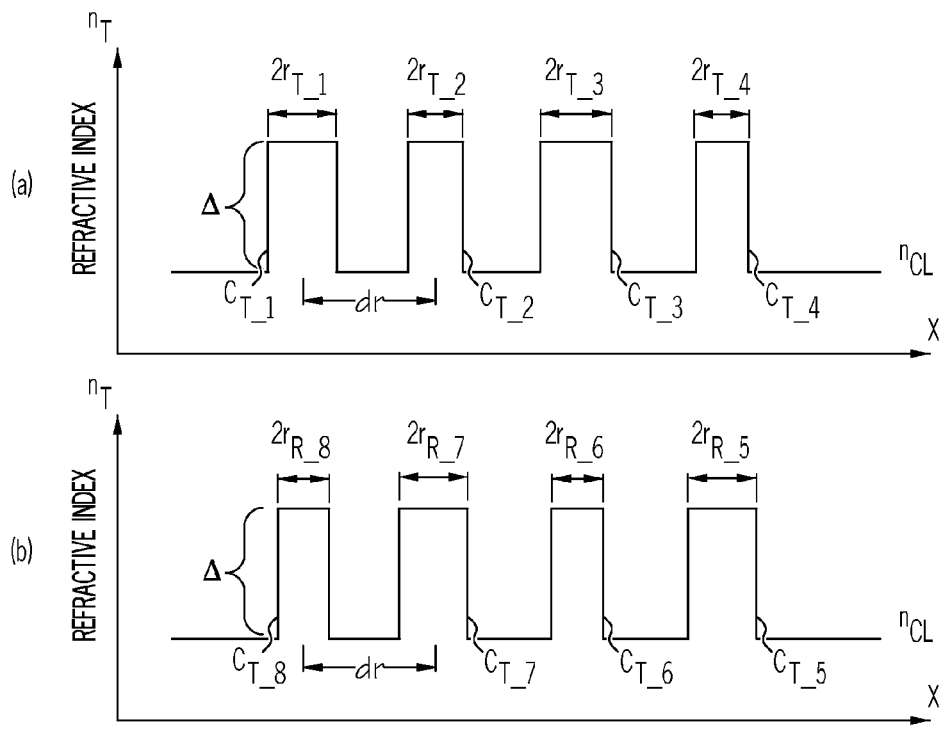
FIG. 6 graphically depicts a refractive index profile of one embodiment of a transmitting multi-core optical fiber.
Figure 7:
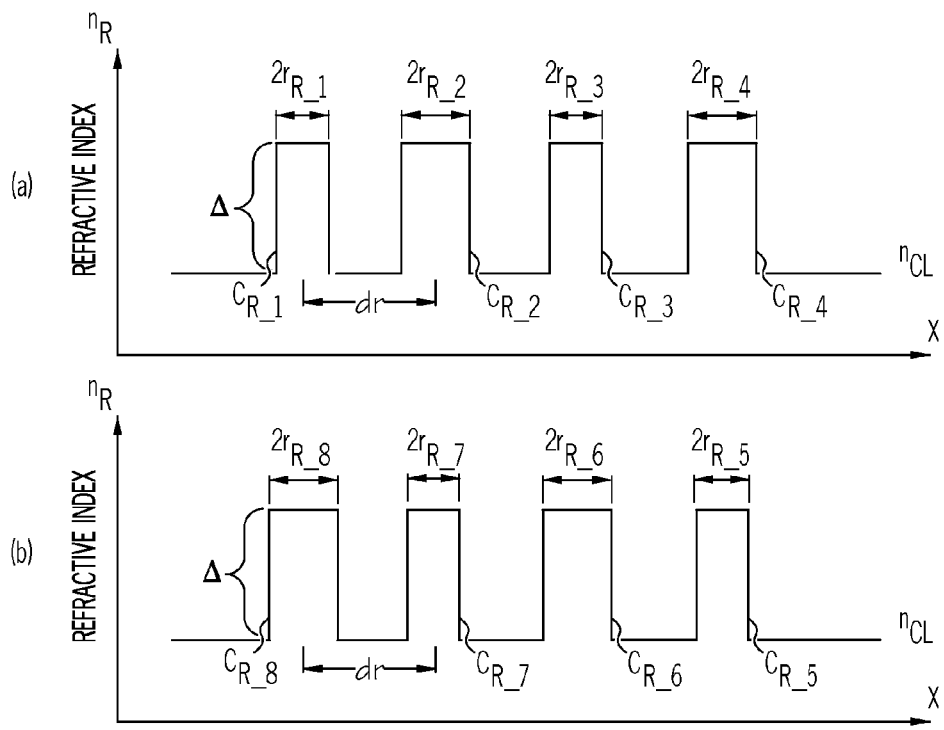
FIG. 7 graphically depicts a refractive index profile of one embodiment of a receiving multi-core optical fiber for use with the transmitting multi-core optical fiber of FIG. 6 and in which the diameter of each receiving core element is different than a diameter of a corresponding transmitting core element.

Referring to FIGS. 6 and 7, in some embodiments, the radii of the core elements $C_{T\_j}$, $C_{R\_j}$ in each of the transmitting multi-core optical fiber 102 and the receiving multi-core optical fiber 104 are different than the radii of adjacent core elements in the fiber to minimize or mitigate crosstalk between adjacent core elements. For example, FIG. 6 shows the refractive index profile of a transmitting multi-core optical fiber 102 which contains eight core elements (i.e., P=8) arranged in two rows of four core elements. As shown in FIG. 6, the radius of each transmitting core element $C_{T\_j}$ in the transmitting multi-core optical fiber 102 is different than the radius of an adjacent core element in the transmitting multi-core optical fiber. For example, transmitting core element $C_{T\_2}$ may have a radius $r_{T\_2}$ which is less than the radii of the adjacent transmitting core elements $C_{T\_1}$, $C_{T\_3}$, and $C_{T\_7}$, each of which have radii $r_{T\_1}$, $r_{T\_3}$, and $r_{T\_7}$, respectively.

In the embodiments described herein, the difference in the radius $r_{T\_j}$ of adjacent transmitting core elements $C_{T\_j}$ (i.e., $|r_{T\_j}-r_{T\_j+1}|$) and the difference in the radius $r_{R\_j}$ of adjacent receiving core elements $C_{R\_j}$ (i.e., $|r_{R\_j}-r_{R\_j+1}|$) is greater than or equal to 0.1 µm or even greater than 0.25 µm. In some embodiments, the difference may be greater than or equal to 0.5 µm or even greater than 1.0 µm.

In another embodiment, the radii $r_{T\_j}$ of the transmitting core elements $C_{T\_j}$ are different than the radii $r_{R\_j}$ of the receiving core elements $C_{R\_j}$ to which they are coupled in order to achieve the desired group refractive indexes $n_{T\_j}{}^g$ and $n_{R\_j}{}^g$ and minimize or mitigate optical signal time delays amongst core elements of the multi-core optical fiber interconnect. Referring to FIGS. 6 and 7 by way of example, the refractive index profile of a transmitting multi-core optical fiber 102 is graphically depicted in FIG. 6 and the refractive index profile of a receiving multi-core optical fiber 104 is schematically depicted in FIG. 7. Each of the transmitting multi-core optical fiber 102 and the receiving multi-core optical fiber 104 contain eight core elements (i.e., P=8) arranged in two rows of four core elements. As shown in FIGS. 6 and 7, the radius $r_{T\_j}$ of each transmitting core element $C_{T\_j}$ in the transmitting multi-core optical fiber 102 is different than the radius $r_{R\_j}$ of the corresponding receiving core element $C_{R\_j}$ in the receiving multi-core optical fiber 104 to which it is coupled. For example, the radius $r_{T\_2}$ of transmitting core element $C_{T\_2}$ in the transmitting multi-core optical fiber 102 is different than the radius $r_{R\_2}$ of the corresponding receiving core element $C_{R\_2}$ in the receiving multi-core optical fiber 104 to which it is coupled. Similarly, the radius $r_{T\_8}$ of transmitting core element $C_{T\_8}$ in the transmitting multi-core optical fiber 102 is different than the radius $r_{R\_8}$ of the corresponding receiving core element $C_{R\_8}$ in the receiving multi-core optical fiber 104 to which it is coupled. In this embodiment, utilizing transmitting core elements $C_{T\_j}$ and corresponding receiving core elements $C_{R\_j}$ with different radii reduces or mitigates optical signal time delays between adjacent interconnect core elements formed by the coupling of the transmitting core elements $C_{T\_j}$ to the corresponding receiving core elements $C_{R\_j}$.

In the embodiments described herein, the difference in the radius $r_{T\_j}$ of the transmitting core elements $C_{T\_j}$ and the radius $r_{R\_j}$ of the corresponding receiving core elements $C_{R\_j}$ (i.e., $|r_{T\_j}-r_{R\_j}|$) is greater than or equal to 0.1 µm or even greater than 0.25 µm. In some embodiments, the difference in the radius $r_{T\_j}$ of the transmitting core elements $C_{T\_j}$ and the radius $r_{R\_j}$ of the corresponding receiving core elements $C_{R\_j}$ is greater than or equal to 0.5 µm or even greater than 1.0 µm.

Considering that the multi-core optical fibers (transmitting and receiving) described herein each contain at least two core elements per fiber (i.e., P≥2) with the first two core elements being adjacent to one another, in embodiments, the first transmitting core element $C_{T\_1}$ of the transmitting multi-core optical fiber may have a radius $r_{T\_1}$ and the first receiving core element $C_{R\_1}$ of the receiving multi-core optical fiber may have a radius $r_{R\_1}$ which is different than the radius $r_{T\_1}$ of the first transmitting core element $C_{T\_1}$ to which it is coupled in order to reduce or mitigate optical signal time delays. Similarly, the second transmitting core element $C_{T\_2}$ of the transmitting multi-core optical fiber has a radius $r_{T\_2}$ and the second receiving core element $C_{R\_2}$ of the receiving multi-core optical fiber has a radius $r_{R\_2}$ which is different than the radius $r_{T\_2}$ of the second transmitting core element $C_{T\_2}$ in order to reduce or mitigate optical signal time delays.

Figure 8:
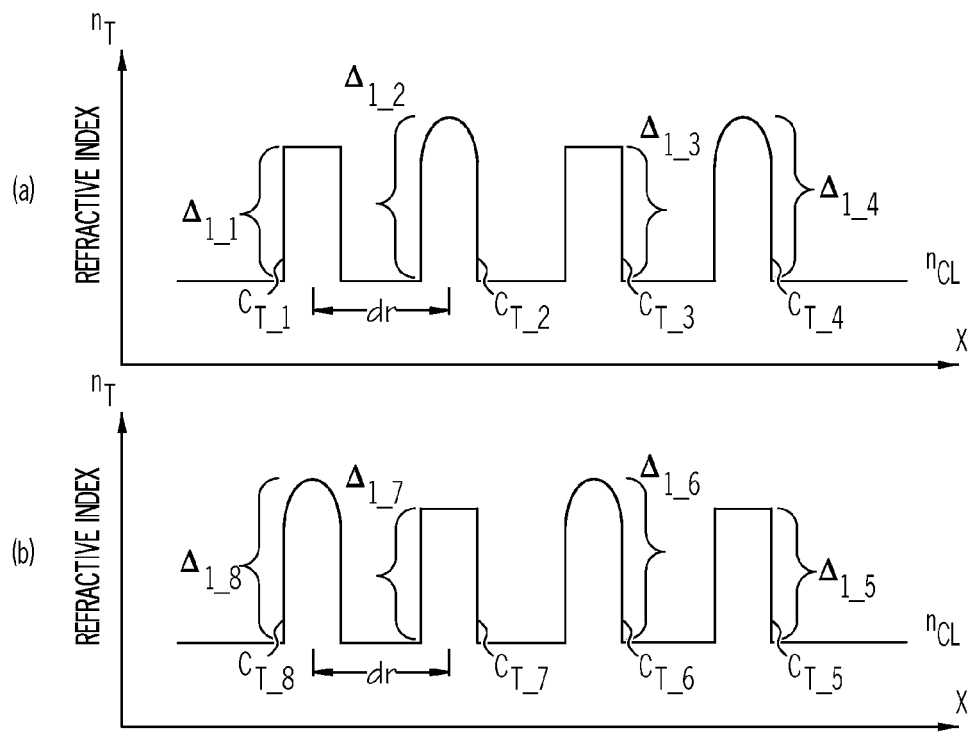
FIG. 8 graphically depicts a refractive index profile of one embodiment of a transmitting multi-core optical fiber.
Figure 9:
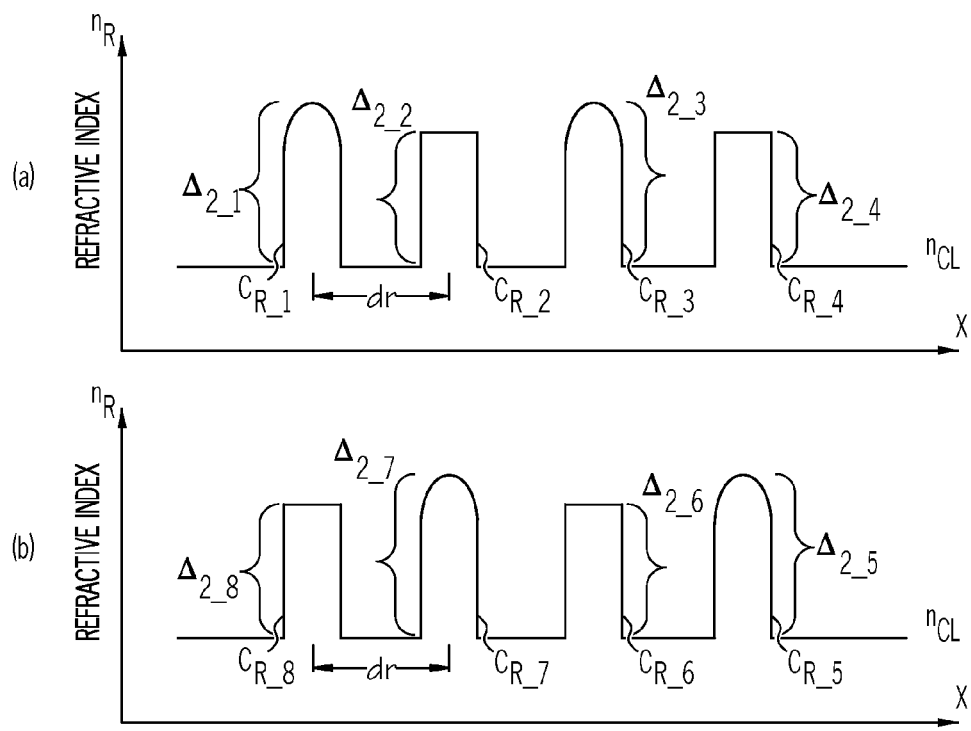
FIG. 9 graphically depicts a refractive index profile of one embodiment of a receiving multi-core optical fiber for use with the transmitting multi-core optical fiber of FIG. 8 and in which the refractive index profile of each receiving core element is different than a refractive index profile of a corresponding transmitting core element.

Referring to FIGS. 8 and 9, in some embodiments, the refractive index profiles of the core elements $C_{T\_j}$, $C_{R\_j}$ in each of the transmitting multi-core optical fiber 102 and the receiving multi-core optical fiber 104 are different than adjacent core elements in the fiber to achieve the desired effective refractive indexes $n_{\mathit{eff}T\_j}$ and $n_{\mathit{eff}R\_j}$ to minimize or mitigate crosstalk between adjacent core elements. For example, FIG. 8 shows the refractive index profile of a transmitting multi-core optical fiber 102 which contains eight core elements (i.e., P=8) arranged in two rows of four core elements. As shown in FIG. 8, the refractive index profile of each transmitting core element $C_{T\_j}$ in the transmitting multi-core optical fiber 102 is different than the refractive index profile of an adjacent core element in the transmitting multi-core optical fiber. For example, transmitting core element $C_{T\_2}$ may have a graded-index refractive index profile (such as the α-profile depicted in FIG. 8) while the adjacent transmitting core elements $C_{T\_1}$, $C_{T\_3}$, and $C_{T\_7}$ have step-index refractive index profiles.

In some other embodiments, the refractive index profiles of the transmitting core elements $C_{T\_j}$ are different than the refractive index profiles of the receiving core elements $C_{R\_j}$ to which they are coupled in order to achieve the desired group refractive indexes $n_{T\_j}^g$ and $n_{R\_j}^g$ and minimize or mitigate optical signal time delays amongst interconnect core elements of the multi-core optical fiber interconnect. Referring to FIGS. 8 and 9 by way of example, the refractive index profile of a transmitting multi-core optical fiber 102 is graphically depicted in FIG. 8 and the refractive index profile of a receiving multi-core optical fiber 104 is schematically depicted in FIG. 9. Each of the transmitting multi-core optical fiber 102 and the receiving multi-core optical fiber 104 contain eight core elements (i.e., P=8) arranged in two rows of four core elements. As shown in FIGS. 8 and 9, the refractive index profile of each transmitting core element $C_{T\_j}$ in the transmitting multi-core optical fiber 102 is different than the refractive index profile of the corresponding receiving core element $C_{R\_j}$ in the receiving multi-core optical fiber 104 to which it is coupled. For example, transmitting core element $C_{T\_2}$ in the transmitting multi-core optical fiber 102 may have a graded-index refractive index profile (such as the α-profile depicted in FIG. 8) while the corresponding receiving core element $C_{R\_2}$ in the receiving multi-core optical fiber 104 to which it is coupled has a step-index refractive index profile as depicted in FIG. 9. Similarly, transmitting core element $C_{T\_7}$ in the transmitting multi-core optical fiber 102 may have a step-index refractive index profile while the corresponding receiving core element $C_{R\_7}$ in the receiving multi-core optical fiber 104 to which it is coupled has a graded-index refractive index profile (such as an α-profile) as depicted in FIG. 9.

In addition, adjacent core elements in each of the transmitting multi-core optical fiber 102 and the receiving multi-core optical fiber 104 have different relative refractive indexes. For example, transmitting core element $C_{T\_3}$ of the transmitting multi-core optical fiber 102 has a relative refractive index $\Delta_{T\_3}$ which is different than the relative refractive index $\Delta_{T\_2}$ of transmitting core element $C_{T\_2}$, the relative refractive index $\Delta_{T\_4}$ of transmitting core element $C_{T\_4}$, and the relative refractive index $\Delta_{T\_6}$ of transmitting core element $C_{T\_6}$. Similar, receiving core element $C_{R\_3}$ of the receiving multi-core optical fiber 104 has a relative refractive index $\Delta_{R\_3}$ which is different than the relative refractive index $\Delta_{R\_2}$ of receiving core element $C_{R\_2}$, the relative refractive index $\Delta_{R\_4}$ of receiving core element $C_{R\_4}$, and the relative refractive index $\Delta_{R\_6}$ of receiving core element $C_{R\_6}$. In this embodiment, varying the relative refractive index between adjacent core elements of both the transmitting multi-core optical fiber 102 and the receiving multi-core optical fiber 104 reduces the crosstalk between adjacent core elements while forming the transmitting core elements $C_{T\_j}$ of the transmitting multi-core optical fiber 102 and the corresponding receiving core elements $C_{R\_j}$ of the receiving multi-core optical fiber 104 with different refractive index profiles reduces or mitigates optical signal time delays between adjacent interconnect core elements formed by the coupling of the transmitting core elements $C_{T\_j}$ to the corresponding receiving core elements $C_{R\_j}$.

Considering that the multi-core optical fibers (transmitting and receiving) described herein each contain at least two core elements per fiber (i.e., P≥2) with the first two core elements being adjacent to one another, the first transmitting core element $C_{T\_1}$ of the transmitting multi-core optical fiber may have a step-index refractive index profile and the first receiving core element $C_{R\_1}$ of the receiving multi-core optical fiber to which it is coupled may have a graded-index refractive index profile in order to reduce or mitigate optical signal time delays. Similarly, the second transmitting core element $C_{T\_2}$ of the transmitting multi-core optical fiber may have a graded-index refractive index profile and the second receiving core element $C_{R\_2}$ of the receiving multi-core optical fiber to which it is coupled may have a step-index refractive index profile in order to reduce or mitigate optical signal time delays. In addition, $\Delta_{T\_1}$ of the first transmitting core element $C_{T\_1}$ is different than $\Delta_{T\_2}$ of the second transmitting core element $C_{T\_2}$ and $\Delta_{R\_1}$ of the first receiving core element $C_{T\_2}$ is different that $\Delta_{R\_2}$ of the second receiving core element $C_{R\_2}$ to reduce crosstalk between the adjacent core elements.

Based on the foregoing, it should be understood that the group refractive index $n^g$ of a core element (transmitting or receiving) is dependent on the relative refractive index $\Delta$ of the core element, the radius r of the core element or the refractive index profile of the core element (i.e., whether the core element has a graded-index refractive index profile or a step-index profile) and that these properties of both the transmitting core elements $C_{T\_j}$ and the receiving core elements $C_{R\_j}$ may be varied during manufacture to achieve the desired group refractive indexes $n_{T\_j}^g$ and $n_{R\_j}^g$ in order to minimize or mitigate optical signal time delays amongst core elements in the multi-core optical fiber interconnect. It should also be understood that various combinations two or all three of these properties may be used to achieve the desired group refractive indexes $n_{T\_j}^g$ and $n_{R\_j}^g$ in order to minimize or mitigate optical signal time delays amongst core elements in the multi-core optical fiber interconnect. For example, combinations of the relative refractive index $\Delta$ of the core element and the radius r of the core element, the relative refractive index $\Delta$ of the core element and the refractive index profile of the core element, the radius r of the core element and the refractive index profile of the core element, or the relative refractive index $\Delta$ of the core element, the radius r of the core element, and the refractive index profile of the core element may be used to achieve the desired group refractive indexes $n_{T\_j}^g$ and $n_{R\_j}^g$ in order to minimize or mitigate optical signal time delays amongst interconnect core elements in the multi-core optical fiber interconnect.

In addition to the foregoing, the mode field diameters of the transmitting core optical fibers $C_{T\_j}$ of the transmitting multi-core optical fiber 102 and the receiving core optical fibers $C_{R\_j}$ of the receiving multi-core optical fiber 104 should be the same or substantially the same in order to minimize insertion losses and crosstalk arising from the coupling of the transmitting multi-core optical fiber 102 and the receiving multi-core optical fiber 104. That is:

$$MFD_{T\_j} \approx MFD_{R\_j}$$

where $MFD_{T\_j}$ and $MFD_{R\_j}$ are the mode field diameters of the $j^{th}$ cores of the transmitting multi-core optical fiber 102 and the receiving multi-core optical fiber 104. This condition can be achieved by selecting the core parameters, such as radius, refractive index, and refractive index profile. In the embodiments described herein, the difference in the mode field diameter $MFD_{T\_j}$ of the transmitting optical fiber core element $C_{T\_j}$ and the mode field diameter $MFD_{R\_j}$ of the receiving optical fiber core element $C_{R\_j}$ (i.e., $|MFD_{T\_j}-$ MFD$_{R\_j}$|) is less than or equal to 1.5 μm, such as less than or equal to 1.0 μm or even less than or equal to 0.75 μm.

The multi-core optical fiber interconnects described herein may be formed using techniques similar to those described in U.S. patent application Ser. No. 13/273,495 filed Oct. 14, 2011 and entitled "MULTI-CORE OPTICAL FIBER RIBBONS AND METHODS FOR MAKING THE SAME," the entirety of which is incorporated herein by reference. While the aforementioned patent application describes methods for making multi-core optical fiber ribbons, it should be understood that similar techniques may be utilized to produce multi-core optical fibers with different cross-sectional configurations, including, without limitation, multi-core optical fibers which are circular in cross section.

EXAMPLES

The embodiments of multi-core optical fiber interconnects described herein will be further clarified by the following hypothetical examples of core elements which may be used for either the transmitting multi-core optical fiber or the receiving multi-core optical fiber of a multi-core optical fiber interconnect.

Example 1

Table 1 below contains six design examples (D1-D6) of single-moded core elements which may be used for either the transmitting multi-core optical fiber or the receiving multi-core optical fiber of a multi-core optical fiber interconnect. Example D1 is similar to a standard single mode fiber core design. The fiber is single-moded at both 1310 and 1550 nm wavelength windows. Example D2 has a higher core delta and smaller core radius than a typical single-moded core element and the mode field diameters (MFDs) are smaller than those of standard single-mode optical fiber core elements. Example D3 has an increased core radius which has the effect of increasing the MFDs of the core element. However, the cutoff wavelength of the LP11 mode is higher than 1310 nm so the fiber is single-moded at only the 1550 nm windows. Example D4 has a graded-index refractive index profile with α=2. Examples D5 and D6 have step-index refractive index profiles which are surrounded by a low-index annulus in the cladding, helping to reduce both fiber bending losses and crosstalk between adjacent core elements.

Example 2

Table 2 below contains six examples of core pairings which may be used to form interconnect core elements of a multi-core optical fiber interconnect, specifically referring to the Examples D1-D6 from Table 1 above. In these examples, Core I may be a transmitting optical fiber core element CT_j of the transmitting multi-core optical fiber and Core II may be a receiving optical fiber core element CR_j of the receiving multi-core optical fiber. Alternatively, Core II may be a transmitting optical fiber core element CT_j of the transmitting multi-core optical fiber and Core I may be a receiving optical fiber core element CR_j of the receiving multi-core optical fiber. As shown in Table 2, the effective index difference between the two cores in each pairing is greater than $0.2 \times 10^{-4}$, which is sufficient to reduce the crosstalk between adjacent interconnect core elements. In addition, the spacing dr between adjacent core elements is greater than or equal to 25 um to further mitigate crosstalk between adjacent core elements. The MFD mismatch between coupled cores (i.e., Core I and Core II) is less than 0.4 um, which is suitable to mitigate splice and coupling losses. Further, the group index (Table 1) of each core element in a pairing is approximately the same, meaning that a multi-core optical fiber interconnect formed from the pairing will have minimal optical signal time delays amongst adjacent interconnect core elements. This also means that the lengths ($L_T$ and $L_R$) of the transmitting multi-core optical fiber and the receiving multi-core optical fiber forming the multi-core optical fiber interconnect being approximately the same.

TABLE 2

Multi-core optical fiber design example.

| | Core I | Core II | Core spacing (um) | Effective Index difference at 1310 nm ($\times 10^{-4}$) | Effective Index difference at 1550 nm ($\times 10^{-4}$) | MFD difference at 1310 nm (um) | MFD difference at 1550 nm (um) |
|---|---|---|---|---|---|---|---|
| 1 | D1 | D2 | 50 | 1.43 | 1.12 | 0.3 | 0.3 |
| 2 | D1 | D3 | 40 | na | 5.4 | na | 0 |
| 3 | D2 | D4 | 45 | 1.60 | 1.12 | 0.3 | 0.4 |
| 4 | D1 | D5 | 35 | 1.35 | 1.17 | 0 | 0.3 |

TABLE 1

Core Element Design Examples

| | Example | | | | | |
|---|---|---|---|---|---|---|
| | D1 | D2 | D3 | D4 | D5 | D6 |
| Core delta (%) | 0.34 | 0.36 | 0.36 | 0.4 | 0.33 | 0.32 |
| Core radius (μm) | 4.3 | 4.2 | 4.8 | 5.6 | 5.0 | 5.1 |
| Alpha | 20 | 20 | 20 | 2 | 20 | 20 |
| Offset (μm) | na | na | na | na | 0 | 1.85 |
| Trench delta (%) | na | na | na | na | −0.1 | −0.4 |
| Trench width (μm) | na | na | na | na | 5 | 3.1 |
| LP11 cutoff wavelength (nm) | 1292 | 1290 | 1469 | 1297 | 1290 | 1293 |
| LP01 mode field diameter at 1310 nm (μm) | 9.1 | 8.8 | na | 9.1 | 9.1 | 9.2 |
| LP01 effective area at 1310 nm (μm$^2$) | 64.5 | 60.9 | na | 62.7 | 67.9 | 71.1 |
| LP01 effective index at 1310 nm | 1.449368 | 1.449511 | na | 1.449351 | 1.449503 | 1.449472 |
| LP01 group index at 1310 nm | 1.467218 | 1.467544 | na | 1.467174 | 1.467361 | 1.467243 |
| LP01 mode field diameter at 1550 nm (μm) | 10.3 | 10.0 | 10.3 | 10.4 | 10.0 | 9.9 |
| LP01 effective area at 1550 nm (μm$^2$) | 81.2 | 77.6 | 83.0 | 81.5 | 79.3 | 80.2 |
| LP01 effective index at 1550 nm | 1.446061 | 1.446173 | 1.446603 | 1.446054 | 1.446178 | 1.446150 |
| LP01 group index at 1550 nm | 1.467848 | 1.468152 | 1.468397 | 1.467757 | 1.468201 | 1.468237 |

TABLE 2-continued

Multi-core optical fiber design example.

| | Core I | Core II | Core spacing (um) | Effective Index difference at 1310 nm (×10$^{-4}$) | Effective Index difference at 1550 nm (×10$^{-4}$) | MFD difference at 1310 nm (um) | MFD difference at 1550 nm (um) |
|---|---|---|---|---|---|---|---|
| 5 | D2 | D6 | 30 | 0.40 | 0.23 | 0.4 | 0.1 |
| 6 | D5 | D6 | 25 | 0.31 | 0.28 | 0.1 | 0.1 |

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A multi-core optical fiber interconnect configured to operate at a wavelength λ comprising:
   a transmitting multi-core optical fiber comprising:
      a length $L_T$;
      a first transmitting core element $C_{T\_1}$ positioned in a first common outer cladding, the first transmitting core element $C_{T\_1}$ having a mode field diameter $MFD_{T\_1}$, a group refractive index $n_{T\_1}^g$ and an effective refractive index $n_{effT\_1}$ at the wavelength λ;
      a second transmitting core element $C_{T\_2}$ positioned in the first common outer cladding adjacent to the first transmitting core element $C_{T\_1}$, the second transmitting core element $C_{T\_2}$ having a mode field diameter $MFD_{T\_2}$, a group refractive index $n_{T\_2}^g$ and an effective refractive index $n_{effT\_2}$ at the wavelength λ, wherein $n_{effT\_1}$ and $n_{effT\_2}$ are different;
   a receiving multi-core optical fiber comprising:
      a length $L_R$;
      a first receiving core element $C_{R\_1}$ positioned in a second common outer cladding, the first receiving core element $C_{R\_1}$ having a mode field diameter $MFD_{R\_1}$, a group refractive index $n_{R\_1}^g$ and an effective refractive index $n_{effR\_1}$ at the wavelength λ;
      a second receiving core element $C_{R\_2}$ positioned in the second common outer cladding adjacent to the first receiving core element $C_{R\_2}$, the second receiving core element $C_{R\_2}$ having a mode field diameter $MFD_{R\_2}$, a group refractive index $n_{R\_2}^g$ and an effective refractive index $n_{effR\_2}$ at the wavelength λ, wherein $n_{effR\_1}$ and $n_{effR\_2}$ are different, wherein:
   the first transmitting core element $C_{T\_1}$ is optically coupled to the first receiving core element $C_{R\_1}$ and the second transmitting core element $C_{T\_2}$ is optically coupled to the second receiving core element $C_{R\_2}$; and $(n_{T\_1}^g L_T + n_{R\_1}^g L_R) = (n_{T\_2}^g L_T + n_{R\_2}^g L_R)$; and $|MFD_{T\_1} - MFD_{R\_1}| \leq 0.5$ μm; and $|MFD_{T\_2} - MFD_{R\_2}| \leq 0.5$ μm.

2. The multi-core optical fiber interconnect of claim 1, wherein the group refractive index $n_{T\_1}^g$ and the group refractive index $n_{R\_1}^g$ are different.

3. The multi-core optical fiber interconnect of claim 2, wherein the group refractive index $n_{T\_2}^g$ and the group refractive index $n_{R\_2}^g$ are different.

4. The multi-core optical fiber interconnect of claim 1, wherein:
   the first transmitting core element $C_{T\_1}$ has a relative refractive index $\Delta_{T\_1}$ at the wavelength λ;
   the first receiving core element $C_{R\_1}$ has a relative refractive index $\Delta_{R\_1}$ at the wavelength λ which is different than the relative refractive index $\Delta_{T\_1}$;
   the second transmitting core element $C_{T\_2}$ has a relative refractive index $\Delta_{T\_2}$ at the wavelength λ;
   the second receiving core element $C_{R\_2}$ has a relative refractive index $\Delta_{R\_2}$ at the wavelength λ which is different than the relative refractive index $\Delta_{T\_2}$;
   the relative refractive index $\Delta_{T\_1}$ of the first transmitting core element $C_{T\_1}$ is different than the relative refractive index $\Delta_{T\_2}$ of the second transmitting core element $C_{T\_2}$ at the wavelength λ; and
   the relative refractive index $\Delta_{R\_1}$ of the first receiving core element $C_{R\_1}$ is different than the relative refractive index $\Delta_{R\_2}$ of the second receiving core element $C_{R\_2}$ at the wavelength λ.

5. The multi-core optical fiber interconnect of claim 4, wherein:
   the first transmitting core element $C_{T\_1}$ has a radius $r_{T\_1}$;
   the first receiving core element $C_{R\_1}$ has a radius $r_{R\_1}$ which is different than the radius $r_{T\_1}$;
   the second transmitting core element $C_{T\_2}$ has a radius $r_{T\_2}$;
   the second receiving core element $C_{R\_2}$ has a radius $r_{R\_2}$ which is different than the radius $r_{T\_2}$;
   the radius $r_{T\_1}$ of the first transmitting core element $C_{T\_1}$ is different than the radius $r_{T\_2}$ of the second transmitting core element $C_{T\_2}$; and
   the radius $r_{R\_1}$ of the first receiving core element $C_{R\_1}$ is different than the radius $r_{R\_2}$ of the second receiving core element $C_{R\_2}$.

6. The multi-core optical fiber interconnect of claim 5, wherein:
   the first transmitting core element $C_{T\_1}$ has a step-index refractive index profile at the wavelength λ;
   the first receiving core element $C_{R\_1}$ has a graded-index refractive index profile at the wavelength λ;
   the second transmitting core element $C_{T\_2}$ has a graded-index refractive index profile at the wavelength λ; and
   the second receiving core element $C_{R\_2}$ has a step-index refractive index profile at the wavelength λ.

7. The multi-core optical fiber interconnect of claim 4, wherein:
   the first transmitting core element $C_{T\_1}$ has a step-index refractive index profile at the wavelength λ;
   the first receiving core element $C_{R\_1}$ has a graded-index refractive index profile at the wavelength κ;
   the second transmitting core element $C_{T\_2}$ has a graded-index refractive index profile at the wavelength λ; and
   the second receiving core element $C_{R\_2}$ has a step-index refractive index profile at the wavelength λ.

8. The multi-core optical fiber interconnect of claim 1, wherein:
   the first transmitting core element $C_{T\_1}$ has a radius $r_{T\_1}$;
   the first receiving core element $C_{R\_1}$ has a radius $r_{R\_1}$ which is different than the radius $r_{T\_1}$;
   the second transmitting core element $C_{T\_2}$ has a radius $r_{T\_2}$;
   the second receiving core element $C_{R\_2}$ has a radius $r_{R\_2}$ which is different than the radius $r_{T\_2}$;
   the radius $r_{T\_1}$ of the first transmitting core element $C_{T\_1}$ is different than the radius $r_{T\_2}$ of the second transmitting core element $C_{T\_2}$; and the radius $r_{R\_1}$ of the first receiving core element $C_{R\_1}$ is different than the radius $r_{R\_2}$ of the second receiving core element $C_{R\_2}$.

9. The multi-core optical fiber interconnect of claim 8, wherein:
   the first transmitting core element $C_{T\_1}$ has a step-index refractive index profile at the wavelength $\lambda$;
   the first receiving core element $C_{R\_1}$ has a graded-index refractive index profile at the wavelength $\lambda$;
   the second transmitting core element $C_{T\_2}$ has a graded-index refractive index profile at the wavelength $\lambda$; and
   the second receiving core element $C_{R\_2}$ has a step-index refractive index profile at the wavelength $\lambda$.

10. The multi-core optical fiber interconnect of claim 1, wherein:
    the first transmitting core element $C_{T\_1}$ has a step-index refractive index profile at the wavelength $\lambda$;
    the first receiving core element $C_{R\_1}$ has a graded-index refractive index profile at the wavelength $\lambda$;
    the second transmitting core element $C_{T\_2}$ has a graded-index refractive index profile at the wavelength $\lambda$; and
    the second receiving core element $C_{R\_2}$ has a step-index refractive index profile at the wavelength $\lambda$.

11. The multi-core optical fiber interconnect of claim 1; wherein:
    the mode field diameter $MFD_{R\_1}$ is substantially the same as the mode field diameter $MFD_{T\_1}$; and
    the mode field diameter $MFD_{R\_2}$ is substantially the same as the mode field diameter $MFD_{T\_2}$.

12. The multi-core optical fiber interconnect of claim 1 further comprising a low-index trench positioned around at least one of the first transmitting core element $C_{T\_1}$, the first receiving core element $C_{R\_1}$, the second transmitting core element $C_{T\_2}$, and the second receiving core element $C_{R\_2}$.

13. The multi-core optical fiber interconnect of claim 1, wherein the length $L_R$ is different than the length $L_T$.

14. A multi-core optical fiber interconnect configured to operate at a wavelength $\lambda$ comprising:
    a first multi-core optical fiber comprising:
      a length $L_T$;
      P transmitting core elements $C_{T\_j}$ positioned in a first common outer cladding, where j is a positive integer from 1 to P, P is greater than 1, and each transmitting core element $C_{T\_j}$ of the first multi-core optical fiber has a mode field diameter $MFD_{T\_j}$, a group refractive index $n_{T\_j}^g$ and an effective refractive index $n_{effT\_j}$ at the wavelength $\lambda$, wherein $n_{effT\_j}$ is different than an effective refractive index of adjacent transmitting core elements in the first multi-core optical fiber at the wavelength $\lambda$;
    a second multi-core optical fiber comprising:
      a length $L_R$; and
      P receiving core elements $C_{R\_j}$ positioned in a second common outer cladding, where j is a positive integer from 1 to P, and each receiving core element $C_{R\_j}$ of the first multi-core optical fiber has a mode field diameter $MFD_{R\_j}$, a group refractive index $n_{R\_j}^g$ and an effective refractive index $n_{effR\_j}$ at the wavelength $\lambda$, wherein $n_{effT\_j}$ is different than an effective refractive index of adjacent receiving core elements in the second multi-core optical fiber at the wavelength $\lambda$, wherein:
    the first multi-core optical fiber and the second multi-core optical fiber are positioned such that each transmitting core element $C_{T\_j}$ is optically coupled to a corresponding receiving core element $C_{R\_j}$ to form an array of interconnect core elements; and
    a sum $(n_{T\_j}^g L_T + n_{R\_j}^g L_R)$ of each interconnect core element is the same for each interconnect core element in the array of interconnect core elements; and
    the difference $|MFD_{T\_j} - MFD_{R\_j}| \leq 0.5$ µm for each interconnect core element in the array of interconnect core elements.

15. The multi-core optical fiber interconnect of claim 14, wherein:
    each transmitting core element $C_{T\_j}$ has a relative refractive index $\Delta_{T\_j}$ at the wavelength $\lambda$; and
    each receiving core element $C_{R\_j}$ has a relative refractive index $\Delta_{R\_j}$ at the wavelength $\lambda$ which is different than the relative refractive index $\Delta_{T\_j}$ of a corresponding transmitting core element $C_{T\_j}$ at the wavelength $\lambda$.

16. The multi-core optical fiber interconnect of claim 14, wherein:
    each transmitting core element $C_{T\_j}$ has a radius $r_{T\_j}$; and
    each receiving core element $C_{R\_j}$ has a radius $r_{R\_j}$ which is different than the radius $r_{T\_j}$ of a corresponding transmitting core element $C_{T\_j}$.

17. The multi-core optical fiber interconnect of claim 14, wherein each transmitting core element $C_{T\_j}$ has a different refractive index profile at the wavelength $\lambda$ than the corresponding receiving core element $C_{R\_j}$.

18. The multi-core optical fiber interconnect of claim 14, wherein:
    the mode field diameter $MFD_{T\_j}$ and
    the mode field diameter $MFD_{R\_j}$ are substantially the same.

19. The multi-core optical fiber interconnect of claim 14, wherein P>2.

20. The multi-core optical fiber interconnect of claim 14, wherein P>4.

21. A multi-core optical fiber interconnect configured to operate at a wavelength $\lambda$ comprising:
    a transmitting multi-core optical fiber comprising:
      a length $L_T$;
      a first transmitting core element $C_{T\_1}$ positioned in a first common outer cladding, the first transmitting core element $C_{T\_1}$ having a group refractive index $n_{T\_1}^g$ and an effective refractive index $n_{effT\_1}$ at the wavelength $\lambda$;
      a second transmitting core element $C_{T\_2}$ positioned in the first common outer cladding adjacent to the first transmitting core element $C_{T\_1}$, the second transmitting core element $C_{T\_2}$ having a group refractive index $n_{T\_2}^g$ and an effective refractive index $n_{effT\_2}$ at the wavelength $\lambda$, wherein $n_{effT\_1}$ and $n_{effT\_2}$ are different;
    a receiving multi-core optical fiber comprising:
      a length $L_R$ different from the length $L_T$;
      a first receiving core element $C_{R\_1}$ positioned in a second common outer cladding, the first receiving core element $C_{R\_1}$ having a group refractive index $n_{R\_1}^g$ and an effective refractive index $n_{effR\_1}$ at the wavelength $\lambda$;
      a second receiving core element $C_{R\_2}$ positioned in the second common outer cladding adjacent to the first receiving core element $C_{R\_2}$, the second receiving core element $C_{R\_2}$ having a group refractive index $n_{R\_2}^g$ and an effective refractive index $n_{effR\_2}$ at the wavelength $\lambda$, wherein $n_{effR\_1}$ and $n_{effR\_2}$ are different, wherein:
    the first transmitting core element $C_{T\_1}$ is optically coupled to the first receiving core element $C_{R\_1}$ and the second transmitting core element $C_{T\_2}$ is optically coupled to the second receiving core element $C_{R\_2}$; and $$(n_{T\_1}{}^g L_T + n_{R\_1}{}^g L_R) = (n_{T\_2}{}^g L_T + n_{R\_2}{}^g L_R).$$

22. The multi-core optical fiber interconnect of claim 21, wherein
the first transmitting core element $C_{T\_1}$ has a mode field diameter $MFD_{T\_1}$ at the wavelength $\lambda$;
the first receiving core element $C_{R\_1}$ has a mode field diameter $MFD_{R\_1}$ at the wavelength $\lambda$;
the second transmitting core element $C_{T\_2}$ has a mode field diameter $MFD_{T\_2}$ at the wavelength $\lambda$; and
the second receiving core element $C_{R\_2}$ has a mode field diameter $MFD_{R\_2}$ at the wavelength $\lambda$, wherein $|MFD_{T\_1} - MFD_{R\_1}| \leq 0.5$ µm; and $|MFD_{T\_2} - MFD_{R\_2}| \leq 0.5$ µm.

23. The multi-core optical fiber interconnect of claim 22, wherein the mode field diameter $MFD_{T\_1}$ and the mode field diameter $MFD_{R\_1}$ are substantially the same and the mode field diameter $MFD_{T\_2}$ and the mode field diameter $MFD_{R\_2}$ are substantially the same.

24. A multi-core optical fiber interconnect configured to operate at a wavelength $\lambda$ comprising:
a first multi-core optical fiber comprising:
a length $L_T$;
P transmitting core elements $C_{T\_j}$ positioned in a first common outer cladding, where j is a positive integer from 1 to P, P is greater than 1, and each transmitting core element $C_{T\_j}$ of the first multi-core optical fiber has a group refractive index $n_{T\_j}{}^g$ and an effective refractive index $n_{effT\_j}$ at the wavelength $\lambda$, wherein $n_{effT\_j}$ is different than an effective refractive index of adjacent core elements in the first multi-core optical fiber at the wavelength $\lambda$;
a second multi-core optical fiber comprising:
a length $L_R$ different from the length $L_T$; and
P receiving core elements $C_{R\_j}$ positioned in a second common outer cladding, where j is a positive integer from 1 to P, and each receiving core element $C_{R\_j}$ of the first multi-core optical fiber has a group refractive index $n_{R\_j}{}^g$ and an effective refractive index $n_{effR\_1}$ at the wavelength $\lambda$, wherein $n_{effT\_j}$ is different than an effective refractive index of adjacent core elements in the second multi-core optical fiber at the wavelength $\lambda$, wherein:
the first multi-core optical fiber and the second multi-core optical fiber are positioned such that each transmitting core element $C_{T\_j}$ is optically coupled to a corresponding receiving core element $C_{R\_j}$ to form an array of interconnect core elements; and
a sum $(n_{T\_j}{}^g L_T + n_{R\_j}{}^g L_R)$ of each interconnect core element is the same for each interconnect core element in the array of interconnect core elements.

25. The multi-core optical fiber interconnect of claim 24, wherein
each transmitting core element $C_{T\_j}$ has a mode field diameter $MFD_{T\_j}$ at the wavelength $\lambda$;
each receiving core element $C_{R\_j}$ has a mode field diameter $MFD_{R\_j}$ at the wavelength $\lambda$; and
the difference $|MFD_{T\_j} - MFD_{R\_j}| \leq 0.5$ µm for each interconnect core element in the array of interconnect core elements.

26. The multi-core optical fiber interconnect of claim 25, wherein the mode field diameter $MFD_{T\_j}$ and the mode field diameter $MFD_{R\_j}$ are substantially the same.

27. A multi-core optical fiber interconnect configured to operate at a wavelength $\lambda$ comprising:
a transmitting multi-core optical fiber comprising:
a length $L_T$;
a first transmitting core element $C_{T\_1}$ positioned in a first common outer cladding, the first transmitting core element $C_{T\_1}$ having a group refractive index $n_{T\_1}{}^g$, an effective refractive index $n_{effT\_1}$ and a step-index refractive index profile at the wavelength $\lambda$;
a second transmitting core element $C_{T\_2}$ positioned in the first common outer cladding adjacent to the first transmitting core element $C_{T\_1}$, the second transmitting core element $C_{T\_2}$ having a group refractive index $n_{T\_2}{}^g$, an effective refractive index $n_{effT\_2}$ and a graded-index refractive index profile at the wavelength $\lambda$, wherein $n_{effT\_1}$ and $n_{effT\_2}$ are different;
a receiving multi-core optical fiber comprising:
a length $L_R$;
a first receiving core element $C_{R\_1}$ positioned in a second common outer cladding, the first receiving core element $C_{R\_1}$ having a group refractive index $n_{R\_1}{}^g$, an effective refractive index $n_{effR\_1}$ and a graded-index refractive index profile at the wavelength $\lambda$;
a second receiving core element $C_{R\_2}$ positioned in the second common outer cladding adjacent to the first receiving core element $C_{R\_2}$, the second receiving core element $C_{R\_2}$ having a group refractive index $n_{R\_2}{}^g$, an effective refractive index $n_{effR\_2}$ at the wavelength $\lambda$, and a step-index refractive index profile at the wavelength $\lambda$;
wherein $n_{effR\_1}$ and $n_{effR\_2}$ are different, and
wherein the first transmitting core element $C_{T\_1}$ is optically coupled to the first receiving core element $C_{R\_1}$ and the second transmitting core element $C_{T\_2}$ is optically coupled to the second receiving core element $C_{R\_2}$; and $$(n_{T\_1}{}^g L_T + n_{R\_1}{}^g L_R) = (n_{T\_2}{}^g L_T + n_{R\_2}{}^g L_R).$$

28. The multi-core optical fiber interconnect of claim 27, wherein
the first transmitting core element $C_{T\_1}$ has a mode field diameter $MFD_{T\_1}$ at the wavelength $\lambda$;
the first receiving core element $C_{R\_1}$ has a mode field diameter $MFD_{R\_1}$ at the wavelength $\lambda$;
the second transmitting core element $C_{T\_2}$ has a mode field diameter $MFD_{T\_2}$ at the wavelength $\lambda$; and
the second receiving core element $C_{R\_2}$ has a mode field diameter $MFD_{R\_2}$ at the wavelength $\lambda$, wherein $|MFD_{T\_1} - MFD_{R\_1}| \leq 0.5$ µm; and $|MFD_{T\_2} - MFD_{R\_2}| \leq 0.5$ µm.

29. The multi-core optical fiber interconnect of claim 28, wherein the mode field diameter $MFD_{T\_1}$ and the mode field diameter $MFD_{R\_1}$ are substantially the same and the mode field diameter $MFD_{T\_2}$ and the mode field diameter $MFD_{R\_2}$ are substantially the same.

30. A multi-core optical fiber interconnect configured to operate at a wavelength $\lambda$ comprising:
a first multi-core optical fiber comprising:
a length $L_T$;
P core elements $C_{T\_j}$ positioned in a first common outer cladding, where j is a positive integer from 1 to P, P is greater than 1, and each core element $C_{T\_j}$ of the first multi-core optical fiber has a group refractive index $n_{T\_j}^g$, an effective refractive index $n_{effT\_j}$, and a step-index refractive index profile at the wavelength $\lambda$, wherein $n_{effT\_j}$ is different than an effective refractive index of adjacent core elements in the first multi-core optical fiber at the wavelength $\lambda$;

a second multi-core optical fiber comprising:
   a length $L_R$; and
   P core elements $C_{R\_j}$ positioned in a second common outer cladding, where j is a positive integer from 1 to P, and each core element $C_{R\_j}$ of the first multi-core optical fiber has a group refractive index $n_{R\_j}^g$, an effective refractive index $n_{effR\_j}$, and a graded-index refractive index profile at the wavelength $\lambda$, wherein $n_{effT\_j}$ is different than an effective refractive index of adjacent core elements in the second multi-core optical fiber at the wavelength $\lambda$, wherein:

the first multi-core optical fiber and the second multi-core optical fiber are positioned such that each core element $C_{T\_j}$ is optically coupled to a corresponding core element $C_{R\_j}$ to form an array of interconnect core elements; and a sum $(n_{T\_j}^g L_T + n_{R\_j}^g L_R)$ of each interconnect core element is the same for each interconnect core element in the array of interconnect core elements.

31. The multi-core optical fiber interconnect of claim 30, wherein
   each core element $C_{T\_j}$ has a mode field diameter $MFD_{T\_j}$ at the wavelength $\lambda$;
   each core element $C_{R\_j}$ has a mode field diameter $MFD_{R\_j}$ at the wavelength $\lambda$; and
   the difference $|MFD_{T\_j} - MFD_{R\_j}| \leq 0.5$ μm for each interconnect core element in the array of interconnect core elements.

32. The multi-core optical fiber interconnect of claim 31 wherein the mode field diameter $MFD_{T\_j}$ and the mode field diameter $MFD_{R\_j}$ are substantially the same.

* * * * *